(12) United States Patent
Yang et al.

(10) Patent No.: US 11,270,057 B1
(45) Date of Patent: Mar. 8, 2022

(54) SEMICONDUCTOR DEVICE INCLUDING REGIONS FOR REDUCING DENSITY GRADIENT EFFECT AND METHOD OF FORMING THE SAME

(71) Applicant: TAIWAN SEMICONDUCTOR MANUFACTURING COMPANY LTD., Hsinchu (TW)

(72) Inventors: Yu-Tao Yang, Hsinchu County (TW); Yung-Hsu Chuang, Hsinchu (TW); Wen-Shen Chou, Hsinchu County (TW); Yung-Chow Peng, Hsinchu (TW)

(73) Assignee: TAIWAN SEMICONDUCTOR MANUFACTURING COMPANY LTD., Hsinchu (TW)

( * ) Notice: Subject to any disclaimer, the term of this patent is extended or adjusted under 35 U.S.C. 154(b) by 0 days.

(21) Appl. No.: 16/991,929

(22) Filed: Aug. 12, 2020

(51) Int. Cl.
G06F 30/30 (2020.01)
G06F 30/398 (2020.01)
G06F 30/3953 (2020.01)
G06F 30/392 (2020.01)
G06F 117/12 (2020.01)

(52) U.S. Cl.
CPC .......... *G06F 30/398* (2020.01); *G06F 30/392* (2020.01); *G06F 30/3953* (2020.01); *G06F 2117/12* (2020.01)

(58) Field of Classification Search
CPC .. G06F 30/398; G06F 30/392; G06F 30/3953; G06F 2117/12

USPC ........................................................ 716/120
See application file for complete search history.

(56) References Cited

U.S. PATENT DOCUMENTS

| | | | |
|---|---|---|---|
| 6,763,509 B2 * | 7/2004 | Korobkov | G06F 30/392 716/122 |
| 7,890,906 B2 * | 2/2011 | Chadwick | G06F 30/39 716/123 |
| 11,055,462 B2 * | 7/2021 | Iskander | G06F 30/367 |
| 2020/0065452 A1 | 2/2020 | Chuang et al. | |

\* cited by examiner

*Primary Examiner* — Jack Chiang
*Assistant Examiner* — Brandon Bowers
(74) *Attorney, Agent, or Firm* — WPAT, P.C. Intellectual Property Attorneys; Anthony King

(57) ABSTRACT

A method includes: generating a design layout according to a circuit design by placing first and second components; identifying a first area and a second area between the first component and the second component; and determining a first cell configuration of the first component according to the first component and a second cell configuration of the second component according to the second component. The method further includes selecting a first cell comprising a first capacitor from a cell library, wherein the first cell has a third cell configuration identical to the first cell configuration; selecting a second cell comprising a second capacitor from the cell library, wherein the second cell has a fourth cell configuration identical to the second cell configuration; placing a first cell array formed of the first cell in the first area; and placing a second cell array formed of the second cell in the second area.

20 Claims, 18 Drawing Sheets

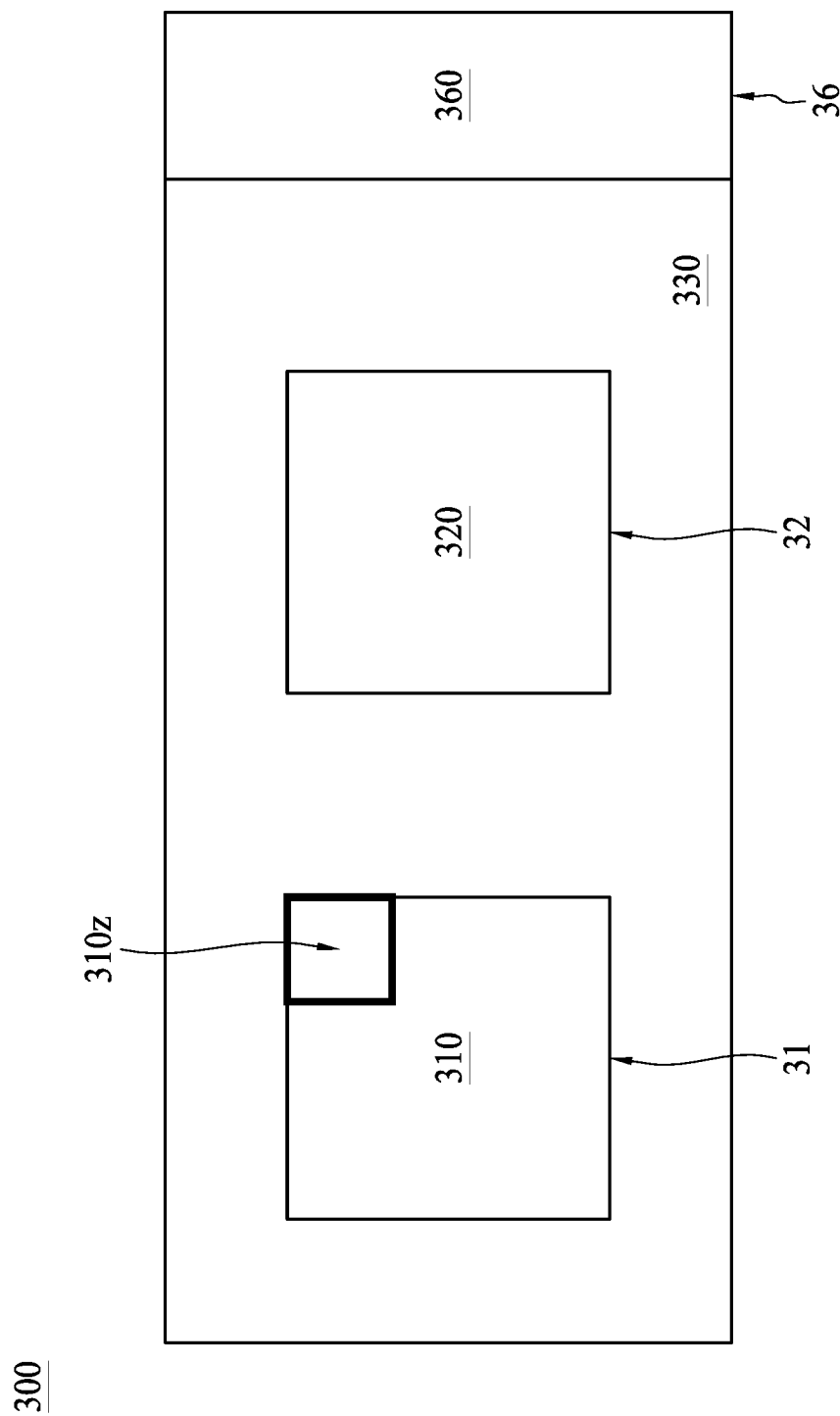

SEMICONDUCTOR DEVICE INCLUDING REGIONS FOR REDUCING DENSITY GRADIENT EFFECT AND METHOD OF FORMING THE SAME

BACKGROUND

The semiconductor integrated circuit (IC) industry has continued to experience rapid growth with technological advances in IC materials and design producing successive generations of ICs, each new generation having smaller geometries and more complex circuits than the previous generation. The complexity of the associated layout, device structures, and manufacturing processes for producing each new generation of ICs has increased correspondingly in order to achieve the designed functional density.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

FIGS. 3 to 8 are schematic diagrams illustrating exemplary operations in a method of manufacturing a semiconductor device, in accordance with some embodiments of the present disclosure.

DETAILED DESCRIPTION

Figure 1:
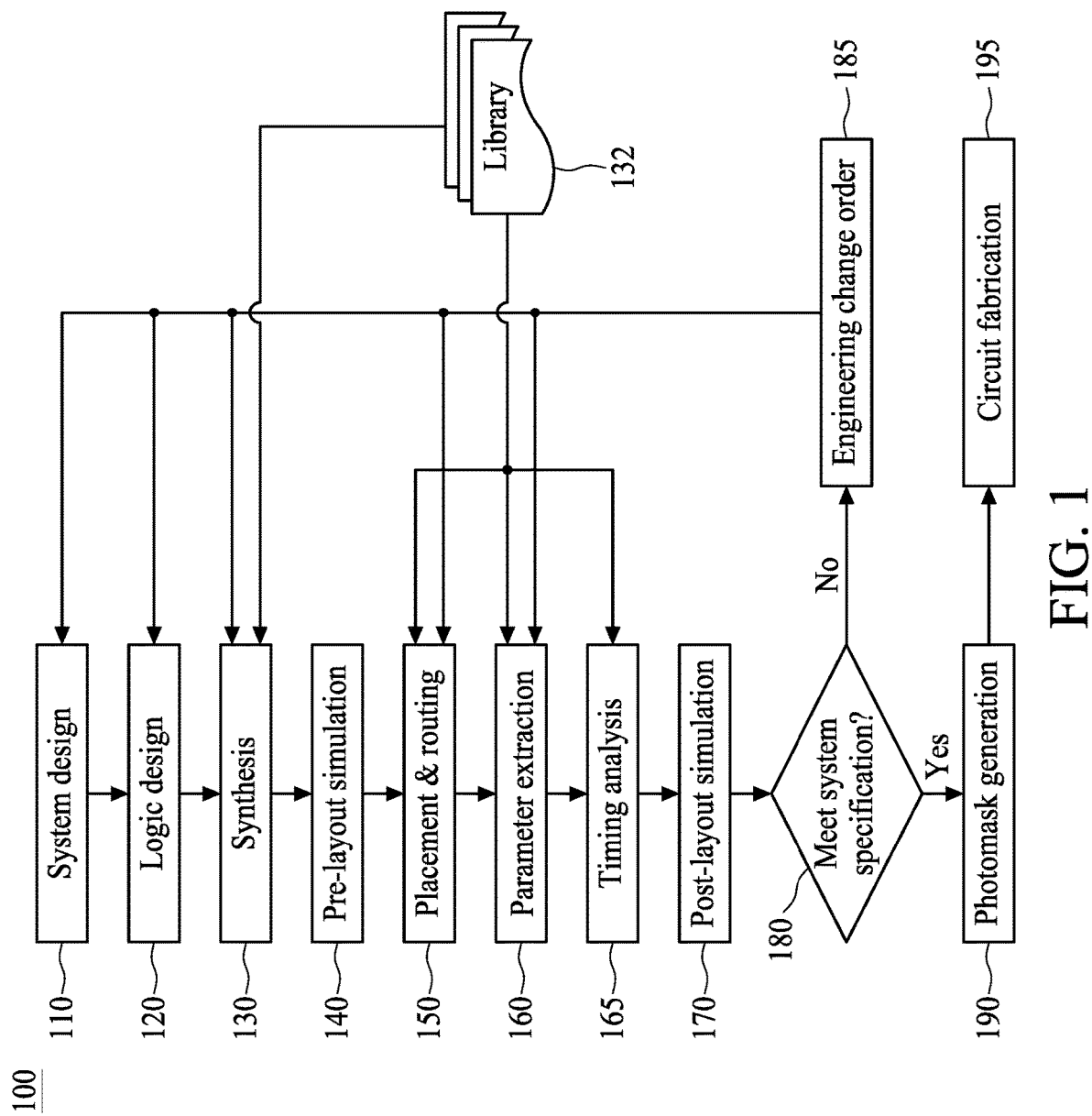
FIG. 1 is a schematic diagram illustrating a design flow of an electronic circuit, in accordance with some embodiments of the present disclosure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Notwithstanding that the numerical ranges and parameters setting forth the broad scope of the disclosure are approximations, the numerical values set forth in the specific examples are reported as precisely as possible. Any numerical value, however, inherently contains certain errors necessarily resulting from the deviation normally found in the respective testing measurements. Also, as used herein, the terms "about," "substantial" or "substantially" generally mean within 10%, 5%, 1% or 0.5% of a given value or range. Alternatively, the terms "about," "substantial" or "substantially" mean within an acceptable standard error of the mean when considered by one of ordinary skill in the art. Other than in the operating/working examples, or unless otherwise expressly specified, all of the numerical ranges, amounts, values and percentages such as those for quantities of materials, durations of times, temperatures, operating conditions, ratios of amounts, and the likes thereof disclosed herein should be understood as modified in all instances by the terms "about," "substantial" or "substantially." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Ranges can be expressed herein as being from one endpoint to another endpoint or between two endpoints. All ranges disclosed herein are inclusive of the endpoints, unless specified otherwise.

The term "cell" or "cell" used throughout the present disclosure refers to a group of circuit patterns in a design layout or a manufactured semiconductor device to implement specific functionalities of a circuit. A cell is comprised of various patterns in one or more layers and may be expressed as unions of polygons. A design layout may be initially constructed by an array of identical or different standard cells during the layout design stage. The geometries of the patterns in the cells may be adjusted at different stages of layout design in order to compensate for design and process effects. A cell may cover circuits corresponding to a portion or an entirety of a die to be manufactured. The cells may be accessible from cell libraries provided by semiconductor circuit manufacturers or designers.

FIG. 1 is a schematic diagram illustrating a design flow 100 of a semiconductor integrated circuit (IC), in accordance with some embodiments. The design flow 100, employed for designing electronic circuits in semiconductor ICs or chips, utilizes one or more electronic design automation (EDA) tools to perform design operations. A standalone computing device or a computing cluster, such as a workstation, a personal computer or a group thereof, is typically used in executing the method of the design flow 100. The design flow 100 includes a system design stage 110, a logic design stage 120, a synthesis stage 130, a pre-layout simulation stage 140, a placement and routing stage 150, a parameter extraction stage 160, a timing analysis stage 165, a post-layout simulation stage 170, an engineering change order (ECO) stage 185, a photomask generation stage 190 and a circuit fabrication stage 195.

Initially, during the system design stage 110, a systematic architecture for the electronic circuit or chip of interest is provided with a high-level description. During the system design stage 110, the chip functions along with performance requirements are determined according to a design specification. The chip functions are usually represented by respective schematic functional modules or blocks. In addition, an optimization or performance trade-off may be sought to achieve the design specification at acceptable levels of cost and power.

During the logic design stage 120, the functional modules or blocks are described in a register transfer level (RTL) using a hardware description language. Commercially available language tools are generally used, such as Verilog or VHDL. In an embodiment, a preliminary functionality check is performed during the logic design stage 120 to verify whether the implemented functions conform to the specification set forth in the system design stage 110. In some embodiments, a timing verification is performed to determine whether the RTL-level circuit design complies with the specification.

Subsequently, during the synthesis stage 130, the modules in the RTL descriptions are converted into an instance of design data, e.g., netlist data, where the circuit structure, e.g., logic gates and registers, of each function module are established. In an embodiment, a library 132, e.g., a cell library is provided to supply different classes of low-level circuits, i.e., cells, serving specific Boolean logic or sequential logic functions. In some embodiments, technology mapping of logic gates and registers to available cells in the cell libraries are conducted. Further, the design data or netlist data is provided to describe the functions the electronic circuit at a gate level. The library 132 may be provided by an IC designer, an IC manufacturing company, an EDA tool provider or any relevant third party. The library 132 also provides the parameters associated with each cell, such as the timing delays, powers, voltages, resistance, capacitance, and the like. In an embodiment, the netlist data is transformed from the gate-level view to a transistor-level view. In an embodiment, when the library 132 is provided or updated (as will be described in subsequent paragraphs herein) and incorporated into the EDA tool, the IC designer can identify whether violations of the design rule (e.g., timing violations) occur and revise the original netlist data in response to the identified violations.

Subsequently, the gate-level netlist data is verified during the pre-layout simulation stage 140. If some functions fail the verification, the design flow 100 may be paused temporarily or may go back to the system design stage 110 or the logic design stage 120 for further modification. After the pre-layout simulation stage 140, the chip design has passed a preliminary verification and the front-end design process is completed. Next, a backend physical design process is conducted. In some embodiments, a timing verification is also performed to determine whether the synthesized netlist data complies with the specification.

During the placement and routing stage 150, a physical architecture representing the electronic circuit, determined during the front-end process, is implemented. Although not illustrated expressly, the layout development may include a floorplan stage in the beginning of or prior to the placement and routing stage 150. The floorplan stage is used for allotting spaces for major functional blocks in a two-dimensional circuit plane. Subsequently, the layout development involves a placement operation and a routing operation in sequence. Detailed structures and associated geometries for the components of the major blocks in the floorplan stage are determined in the placement operation. Interconnects among different components are routed subsequent to the placement operation. Both placement and routing operations are performed to meet the requirements of a design rule check (DRC) deck so that the manufacturing constraints of the chip are met. In an embodiment, a clock tree synthesis operation is performed at the placement and routing stage for a digital circuit in which clock generators and circuits are incorporated into the design layout. In an embodiment, a timing analysis or verification operation is performed to determine whether the tentative layout arrangements meet the design specification, and a post-routing operation is performed subsequent to the preliminary routing operation in order to resolve timing issues discovered during the timing verification operation. Once the placement and routing stage 150 is completed, a placed-and-routed layout is created and a netlist along with data on placement and routing is generated accordingly.

During the parameter extraction stage 160, a layout parameter extraction (LPE) operation is conducted to derive layout-dependent parameters, such as parasitic resistance and capacitance, based on the layout developed in the placement and routing stage 150. As a result, post-layout netlist data, including the layout with the layout-dependent parameters, is generated.

Subsequently, a timing analysis or timing verification is performed during the timing analysis stage 165. The timing verification performed in the timing analysis stage 165 may be performed in accordance with the layout-dependent parameters extracted in the parameter extraction stage 160, and indicates the behavior of the circuit under the effects of parasitic resistance and capacitance. The library 132 may be involved in the timing analysis operation of the timing analysis stage 165.

During the post-layout simulation stage 170, a physical verification is performed, taking into consideration the parameters acquired in previous stages. A simulation of transistor-level behavior is conducted to examine whether the chip performance derived by the post-layout netlist meets the system specifications. In some embodiments, the post-layout simulation is performed to minimize probability of electrical issues or layout difficulties during the chip manufacturing process. In an embodiment, the library 132 is provided not only for the synthesis stage 130, but also for the pre-layout simulation stage 140, the placement and routing stage 150, the parameter extraction stage 160 and the post-layout simulation stage 170. As such, the electrical or geometric parameters of the cells and other features listed in the library 132 can be leveraged to emulate the real-world behavior and performance of the electronic circuit throughout each stage of the design flow 100.

Next, in stage 180, it is determined whether the post-layout netlist meets the design specifications. If the result of the post-layout simulation is unfavorable, the design flow 100 loops back to previous stages for tuning functionalities or structures. For example, the design flow 100 may proceed with the ECO stage 185 for identifying or fixing the problem of the electronic circuit. The EDA tool or a designer would issue one or more engineering change orders (ECOs) in the ECO stage 185 to modify the design layout, in which the driving capability of one or more placed electrical devices are upgraded, or one or more routed lines are rearranged. In some embodiments, after the ECO operation in the ECO stage 185, the design flow 100 loops back to the placement and routing stage 150 where the layout is re-developed to resolve issues resulting from the ECO operation. In some embodiments, the design flow 100 proceeds with the parameter extraction stage 160 for performing parameter extraction based on the result of the ECO operation. Alternatively, the design flow 100 may retreat to an earlier stage, such as the system design stage 110 or the logic design stage 120, to recast the chip design from a functional level in case the problems cannot be resolved within the back-end process.

If the post-layout netlist passes the verification, the circuit design is accepted and then signed off accordingly. The electronic circuit is manufactured according to the accepted post-layout netlist. In an embodiment, during the photomask generation stage 190, at least one photomask is generated based on the verified post-layout netlist in the post-layout simulation stage 170. In some embodiment, the generation of the photomask includes preparing a photomask data, fabricating a photomask, and inspecting the photomask. In some embodiment, the preparation of the photomask includes repairing or modifying the photomask data so that a revised design layout can allow a mask writer to transfer the design layout passing the post-layout simulation to a writer-readable format.

In some embodiment, fabricating the photomask includes preparing a substrate based on the design layout provided by the prepared photomask data. A mask substrate is exposed to a radiation beam, such as an electron beam, based on the pattern of the design layout in a writing operation, which may be followed by an etching operation to leave behind the patterns corresponding to the design layout. An electron-beam (e-beam), multiple e-beams, an ion beam, a laser beam or other suitable writer source may be used to transfer the patterns.

Accordingly, a photomask is a patterned mask used to allow a portion of radiation to pass through or reflect off the photomask while blocking or absorbing the remaining portions of the radiation in order to form a pattern of features on a light-sensitive layer, e.g., a photoresist layer, on a substrate. As a result, the patterns defined by the verified post-layout netlist are transferred to the photoresist layer. In some embodiments, a multi-layer layout netlist may require a set of photomasks in which the feature pattern in each layer is established in the corresponding photomask. Therefore, the patterns of the layout netlist formed on the photomasks are transferred to the light-sensitive layer through a lithography operation. After the photomask is fabricated, the fabricated photomask is inspected to determine if any defects, such as full-height and non-full-height defects, exist in the fabricated photomask. If any defects are detected, the photomask may be cleaned or the design layout in the photomask may be modified.

During the circuit fabrication stage 195, the circuit is fabricated on the substrate, e.g., a semiconductor wafer, using the patterns of the photomasks generated in the photomask generation stage 190, and an IC manufacturing entity that includes multiple manufacturing facilities or tools for the fabrication stage 195 may be used. The fabrication may involve known semiconductor manufacturing operations, such as lithography, etching, ion implantation, deposition, planarization, and thermal treatment. In some embodiments, the circuit fabrication stage 195 uses the photomask fabricated by the photomask generation operation to fabricate a wafer having a plurality of integrated circuits (ICs) thereon. The wafer includes a semiconductor substrate and optionally various layers formed thereon. The operations provided by the manufacturing facilities or tools may include, but not limited to, photolithography, deposition, sputtering, etching, diffusion, ion implantation and annealing. In some embodiments, a testing operation may be utilized in an intermediate or final phase of the circuit fabrication stage 195 to ensure physical and functional integrity of the fabricated circuit. In some embodiments, a singulation operation may be used to separate the semiconductor wafer into individual circuit dies. The fabrication of the circuit is thus completed.

The design flow 100 illustrated in FIG. 1 is exemplary. Modifications to the above-mentioned stages, such as changes of order of the stages, partition of the stages, and deletion or addition of stages, are within the contemplated scope of the present disclosure.

Figure 2A:
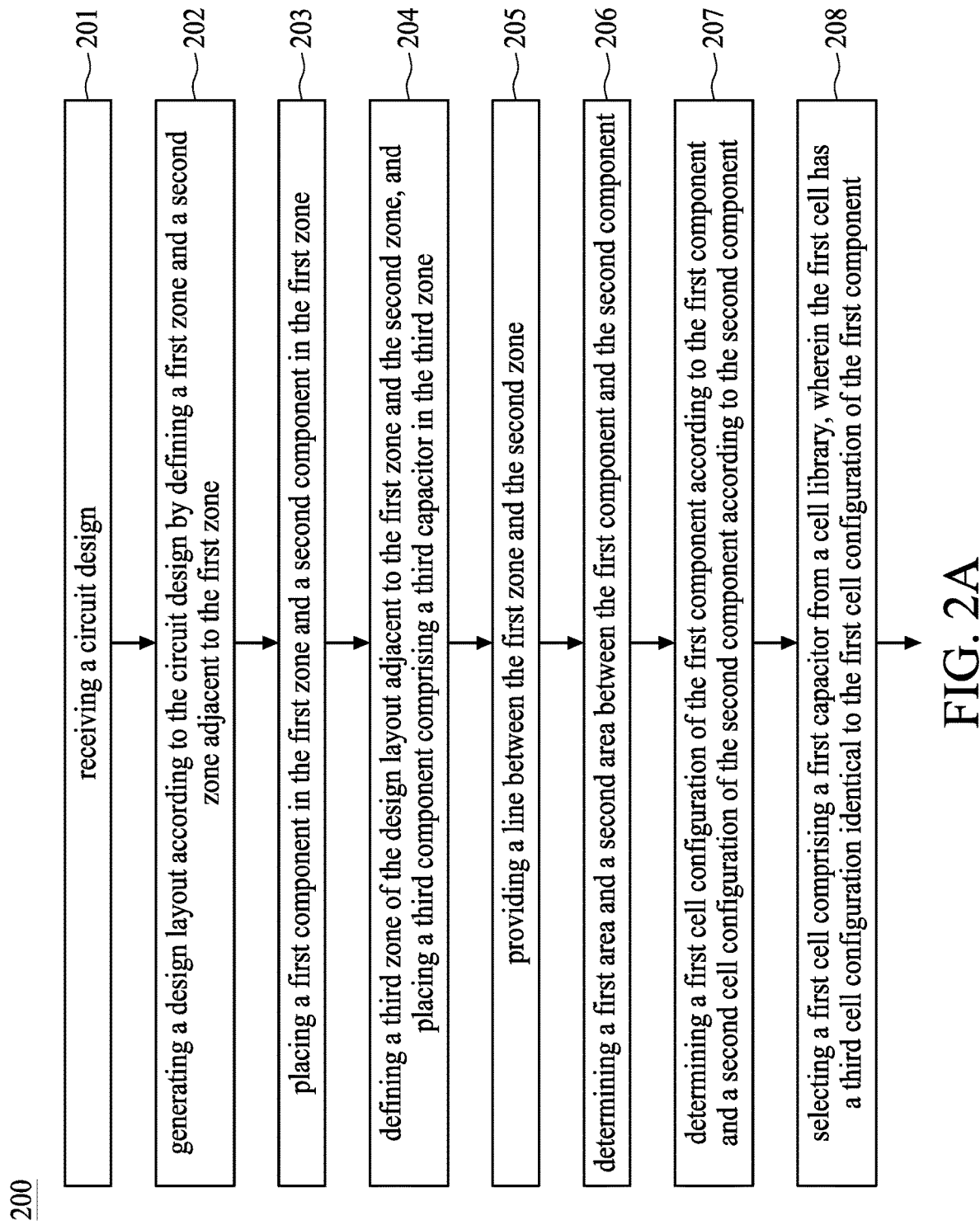
FIGS. 2A and 2B collectively illustrate a flowchart of a method, in accordance with some embodiments of the present disclosure.
Figure 2B:
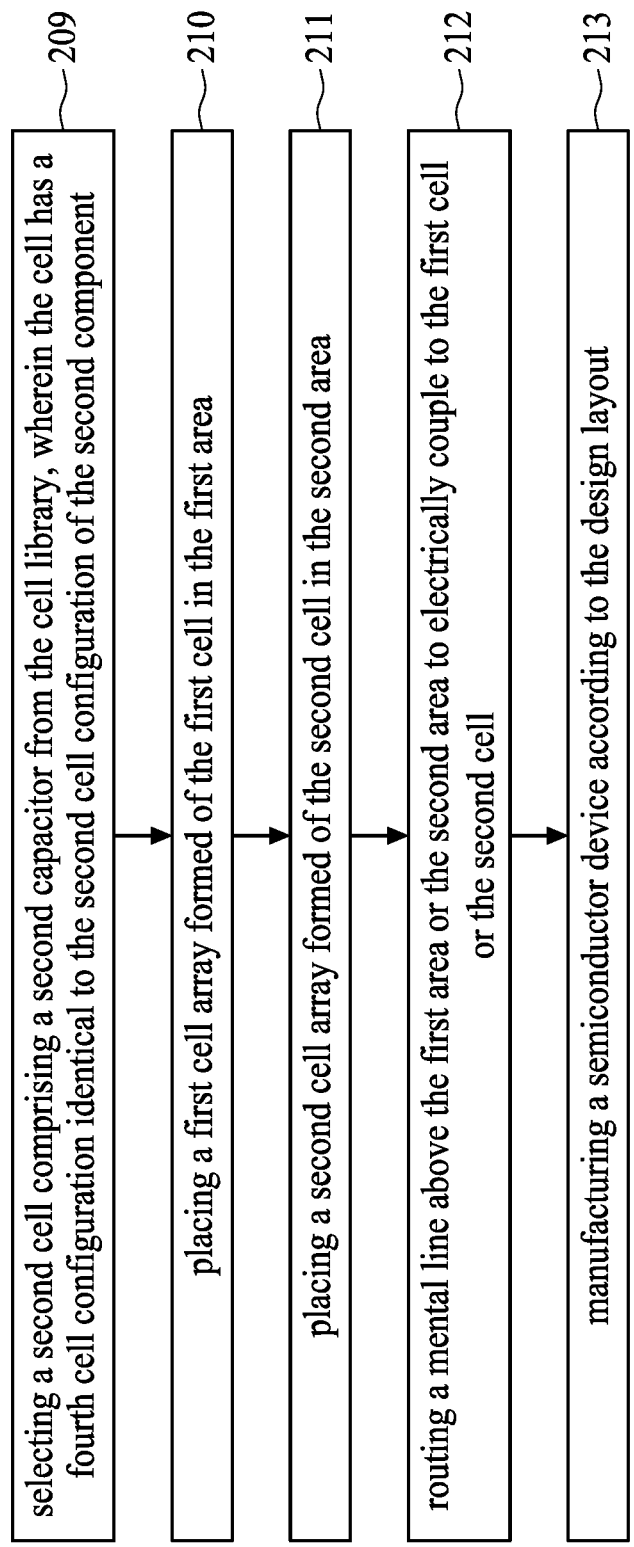

FIGS. 2A and 2B collectively illustrate a flowchart of a method 200 of manufacturing a semiconductor device, in accordance with some embodiments. The method 200 may be part of the operations in the placement and routing stage 150 shown in FIG. 1. Additional steps can be provided before, during, and after the steps shown in FIG. 2, and some of the steps described below can be replaced or eliminated in other embodiments of the method 200. The order of the steps may be interchangeable. FIGS. 3 to 8 are schematic diagrams illustrating exemplary operations for method of manufacturing a semiconductor device according to one embodiment of the present disclosure.

Referring to FIGS. 2A and 3, in some embodiments, in step 201, a circuit design for an electronic circuit is received. In some embodiments, the circuit design is obtained through the synthesis operation of the synthesis stage 130 as shown in FIG. 1. In step 202, a design layout 300 according to the circuit design is generated. In some embodiments, the design layout 300 defines a first zone 31 and a second zone 32 adjacent to the first zone 31. In some embodiments, the first zone 31 is separated from the second zone 32 to achieve electrical isolation or meet other design requirements. The first zone 31 or the second zone 32 is reserved for one or more devices, which will be describe later.

The design layout 300 may be related to or part of a semiconductor device, e.g., a complementary metal-oxide-semiconductor (CMOS) device, and can be implemented using a planar field-effect transistor (FET) device, a fin-type FET (FinFET) device, a gate-all-around (GAA) device, a nanowire device, a fully-depleted silicon-on-isolator (FD-SOI) device, or the like.

Referring to FIGS. 2A and 3, in step 203, a first component 310 is placed in the first zone 31. Likewise, a second component 320 is placed in the second zone 32. In some embodiments, the first component 310 and the second component 320 may be placed during a single placement operation. In some embodiment, the first component 310 is adjacent to the second component 320.

In some embodiments, each of the first component 310 and the second component 320 is formed of one or more cells, wherein the cell corresponds to a specifically designed circuit. In some embodiments, each of the first component 310 and the second component 320 is a central processing unit, a graphics processing unit, a controller, a memory device, a network interface device, a transmitter, a receiver, a signal processing unit, a field programmable gate array (FGPA), an application-specific integrated circuit (ASIC), or any other processing or storage units. In some embodiments, each of the first component 310 and the second component 320 is a passive component such as a resistor, a capacitor, a magnetic device, or the like. In some embodiments, the cells in the first component 310 or the second component 320 may be related to or part of a logic device, e.g., a NAND gate, an inverter gate, an XOR gate, an AND gate, a NOR gate, an AOI gate, or other suitable logic gate devices. In some embodiments, the cells in the first component 310 or the second component 320 may be related to or part of or related to a register or the like. In some embodiments, the cells in the first component 310 or the second component 320 is configured as a complementary metal-oxide-semiconductor (CMOS) device, and can be implemented using a planar field-effect transistor (FET) device, a fin-type FET (FinFET) device, a gate-all-around (GAA) device, a nanowire device, a fully-depleted silicon-on-isolator (FDSOI) device, or the like.

The cells in the first component 310 have a first cell configuration, and the cells in the second component 320 have a second cell configuration the same as or different from the first cell configuration. The term "cell configuration" used throughout the present disclosure refers to a set of parameters of the cell describing the geometries, dimensions and distances for the features in the cell, for example, a gate width, a gate density, a gate height, a fin height, a fin width, a gate pitch, a fin pitch (fin density), a power rail density a cell length, a row height, and a length/width of an active region. Other parameters of dimensions and distances are also within the contemplated scope of the present disclosure. In some embodiments, the cells of the first component 310 are further electrically connected to one or more power rails (not shown). Similarity, the cells of the second component 320 are further electrically connected to one or more power rails (not shown in FIG. 2A, but illustrated in FIG. 9).

Figure 9:
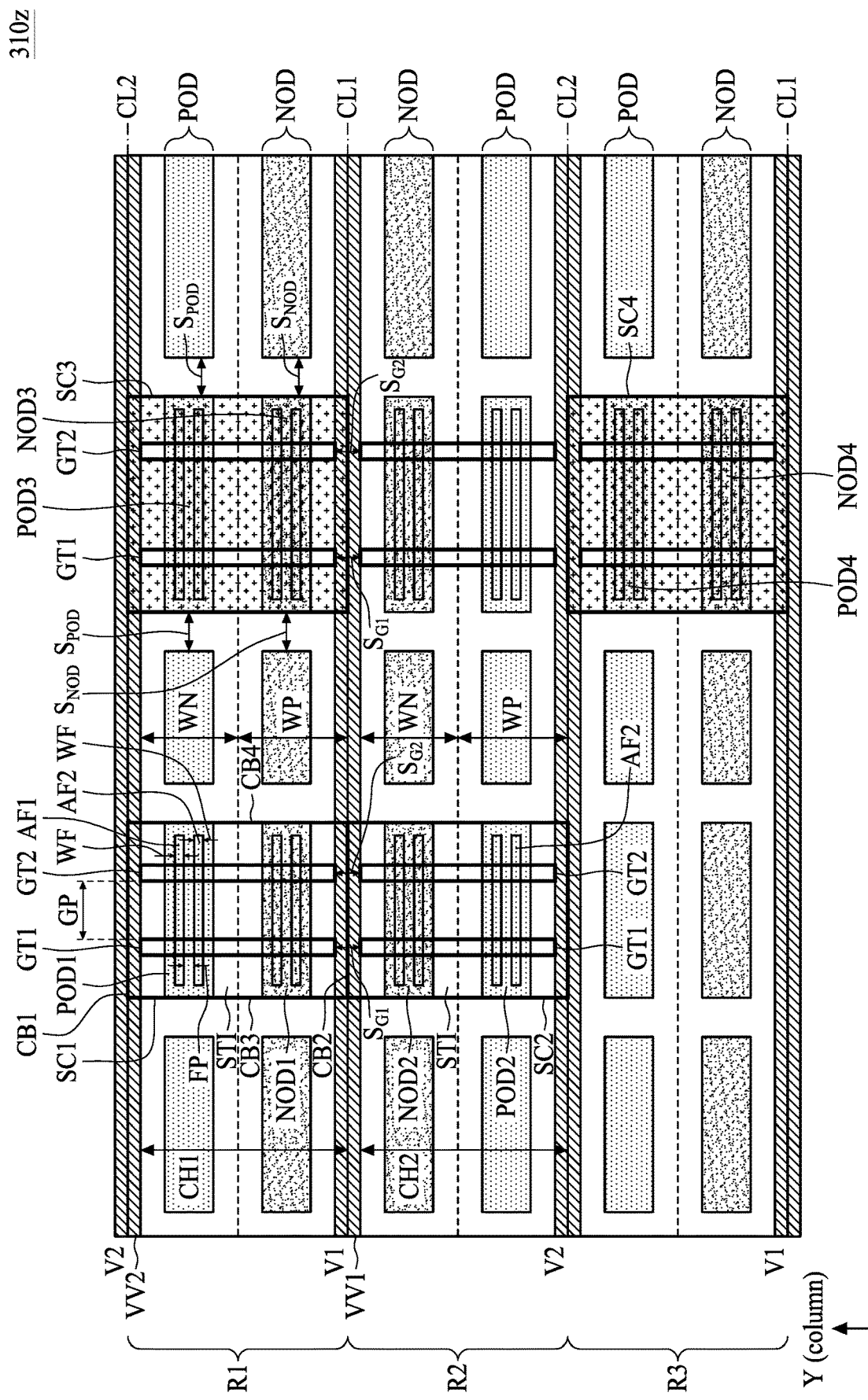
FIG. 9 is a schematic diagram of a design layout, in accordance with some embodiments of the present disclosure.

FIG. 9 is a schematic diagram of a design layout of a portion 310z of the first component 310, in accordance with some embodiments of the present disclosure. A zoom-in view of the portion 310z is shown.

In some embodiments, the portion 310z includes three rows R1 to R3 extending in a row direction. A plurality of first power rails V1 for supplying the first voltage and a plurality of second power rails V2 for supplying the second voltage are alternatingly arranged and extend in the row direction. Each of the first power rails V1 and the second power rails V2 is arranged on an upper side or a lower side of one of the rows R1 to R3. In some embodiments, the center line of each of the first power rails V1 and the second power rails V2 is aligned with the upper side or lower side of one of the rows R1 to R3.

In some embodiments, a row height of a first row R1 is defined as a distance in the column direction between a center line CL1, extending in the row direction, of the lower first power rail V1 and the center line CL2, extending in the row direction, of the upper second power rail V2. In some embodiments, a cell height CH1 of the cell SC1 is determined based on a pitch between the first power rail V1 and the second power rail V2.

Similarly, a row height of a second row R2 is defined as a distance in the column direction between a center line CL1, extending in the row direction, of the upper first power rail V1 and the center line CL2 of the lower second power rail V2. In some embodiments, the row height of the second row R2 is determined based on a pitch between the upper first power rail V1 and the lower second power rail V2. In some embodiments, the row height of the first row R1 is the same as or different from the row height of the second row R2.

Each of the rows R1 to R3 includes a pair of active regions, also referred to herein as oxide-definition ("OD") regions having opposite conductivity types and extending in the row direction. The active regions include a P-type active region POD and an N-type region NOD. In some embodiments, the orders of the active regions NOD and POD in adjacent rows are interchanged row by row in the portion 310z or in the first component 310. For example, two adjacent P-type active regions POD in the rows R1 and R2 are arranged between the two N-type active regions NOD in the rows R1 and R2. Likewise, two adjacent N-type active regions NOD in the rows R2 and R3 are arranged between the two P-type active regions POD in the rows R2 and R3.

In some embodiments, each of the P-type active regions POD includes a plurality of segments of the P-type active region POD. In some embodiments, a spacing (also refer as an OD cut) $S_{POD}$ is disposed between the adjacent segments of the active region. In some embodiments, the spacing $S_{POD}$ are substantially equal in each P-type active region POD. In some embodiments, the spacing $S_{POD}$ in each rows R1 to R3 are aligned alone the column direction.

Similarity, each of the N-type active regions NOD includes a plurality of segments of the N-type active region NOD. In some embodiments, a spacing (also refer as an OD cut) $S_{NOD}$ is disposed between the adjacent segments of the active region. In some embodiments, the spacings $S_{NOD}$ are substantially equal in each of the N-type active region NOD. In some embodiments, the spacing $S_{NOD}$ in different rows R1 to R3 are aligned alone the column direction. In some embodiments, the spacing $S_{POD}$ and the $S_{NOD}$ are substantially equal in each of the rows R1 to R3.

The active region NOD or POD may be used to form source/drain regions and a channel region between the source/drain regions of a FET device. In some embodiments, the N-type active region NOD is a semiconductor intrinsic region (such as silicon) doped with N-type impurities, such as arsenic, phosphorus, or the like. In some embodiments, the P-type active region POD is a semiconductor intrinsic region doped with P-type impurities, such as boron or the like. The active regions NOD and POD are separated and defined by isolation structures, such as a shallow trench isolation structure STI. In some embodiments, the isolation structure STI is formed of dielectric materials, such as oxide, nitride, oxynitride, silicon dioxide, nitrogen-bearing oxide, nitrogen-doped oxide, silicon oxynitride, polymer, or the like.

In some embodiments, the layout portion 310z includes one or more gate electrodes GT1 or GT2 extending in the column direction and disposed over the active regions POD and NOD in each of the rows R1 to R3. In embodiments of planar FET devices, the active regions POD and NOD and the corresponding gate electrode GT1 or GT2 may be used together for defining a source region, a drain region and a channel region below the respective gate electrode of a FET device. In some embodiments, the gate electrodes GT1 and GT2 are aligned with each other along the column direction. In some embodiments, the gate electrodes GT1 and GT2 are separated by a gate pitch GP. In some embodiments, the gate electrode GT1 or GT2 is partitioned into gate electrode segments for different cells, in which the segments of the gate electrode GT1 or GT2 do not overlap the power rails V1 and V2.

In some embodiments, the gate electrodes GT1 is segmented, a spacing $S_{G1}$ (also refer as a gate electrode cut) extending in the column direction is disposed between the adjacent gate electrode GT1 of the adjacent rows R1 to R3. In some embodiments, the spacings $S_{G1}$ are substantially equal. In some embodiments, the spacings $S_G$ are aligned alone the row direction. Similarity, the gate electrodes GT2 is segmented, a spacing $S_{G2}$ (also refer as a gate electrode cut) extending in the column direction is disposed between the adjacent gate electrode GT2 of the adjacent rows R1 to R3. In some embodiments, the spacings $S_{G2}$ are substantially equal. In some embodiments, the spacings $S_{G2}$ are aligned alone the row direction.

Each of the active regions NOD and POD may include one or more fin structures AF1, AF2 disposed over the corresponding active regions POD and NOD and extending in the row direction. In embodiments of FinFET devices, the fin structures AF1, AF2 and the corresponding gate electrode GT1 or GT2 may be used together for forming a FinFET device. In some embodiments, the fin structures AF1, AF2 are aligned with each other along the row direction. In some embodiments, the fin structures AF1, AF2 are separated by a fin pitch FP. In some embodiments, the fin structures AF1, AF2 are partitioned into segments for different cells, in which the segments of the fin structure AF1 or AF2 do not overlap the power rails V1 and V2.

For example, in some embodiments, an effective width WP or WN of the respective P-type active region POD or N-type active region NOD is measured in the column direction. In some embodiments, the P-type active region POD and the N-type active region NOD disposed between the adjacent power rails V1 and V2 have substantially equal widths in the column direction, i.e., WP=WN.

Figure 10:
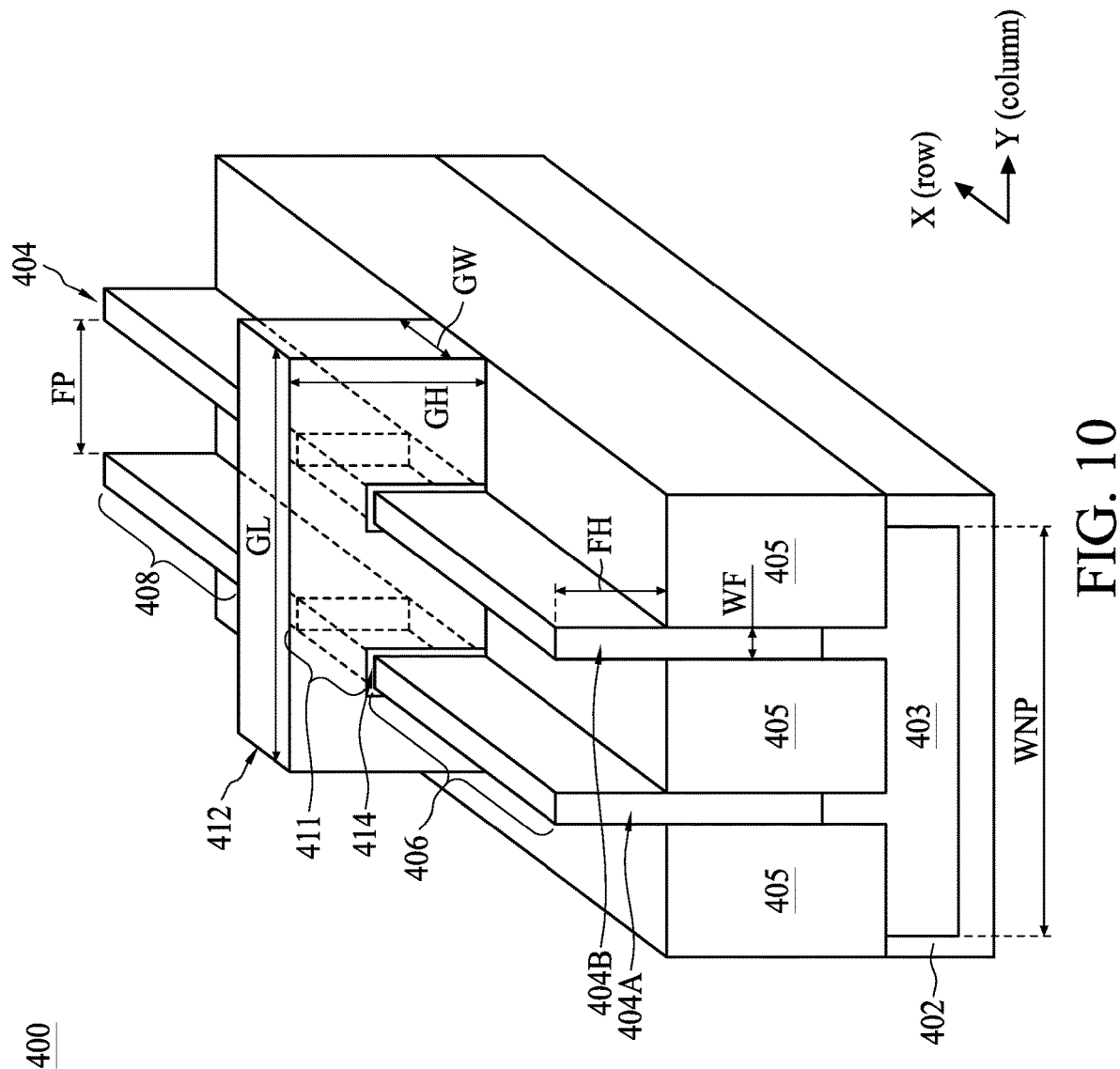
FIG. 10 is a perspective view of a fin field-effect transistor (FinFET) device, in accordance with some embodiments of the present disclosure.

FIG. 10 is a perspective view of a FinFET device 400, according to some embodiments of the present disclosure. Referring to FIG. 10, the FinFET device 400 includes a substrate 402, which can be a silicon substrate or other suitable semiconductor substrate. Two exemplary fin structures 404 (e.g., fin structures 404A and 404B), which correspond to the fin structures AF1, AF2 in FIG. 9, are formed from and protrude from the substrate 402. The fin structures 404A and 404B are parallel to each other and separated by a trench formed in the substrate 402 with the fin pitch FP. A lower portion of the fin structure 404A or 404B is embedded in an isolation structure 405 (corresponding to the STI of FIG. 9), while an upper portion of the fin structure 404A or 404B is exposed through the surface of the isolation structure 405. A fin height FH of the fin structure 404A or 404B is defines as a distance between the surface of the isolation structure 405 and the upper surface of the fin structure 404A or 404B.

The upper portion of each of the fin structures 404A and 404B includes a source region 406, a drain region 408 and a channel region 410 interposed between the source region 406 and the drain region 408. In some embodiments, the source region 406 and the drain region 408 are formed of doped regions and contain impurities having a dopant concentration in a suitable range, e.g., between about 1E18 cm$^{-3}$ and about 1E×20 cm$^{-3}$. The channel region 410 may be undoped or lightly doped. In some embodiments, the source region 406 and the drain region 408 are formed by etching the upper portions of the fin structure 404 followed by epitaxially growing semiconductor layers over the etched upper portions. In some embodiments, a doped region 403 is formed in the substrate 402 below the isolation structure 405. In some embodiments, the doped region 403 extends to a lower portion of each of the fin structures 404A and 404B.

A gate electrode 412, which corresponds to the gate electrodes GT1, GT2 in FIG. 9, is formed over the fin structures 404A and 404B. In some embodiments, the gate electrode 412 is made of one or more layers of conductive materials, such as tungsten, cobalt and copper, and may further include other work function adjusting metals, such as Ti, Al, TiAl, TiN, TaC, and the like. The gate electrode 412 extends to cover sidewalls of the channel region 410 and portions of the isolation structure 405. The gate electrode 412 has a gate length GL in the column direction, a gate width GW in the row direction and a gate height GH. The FinFET device 400 may also include a gate insulating layer 414 between the gate electrode 412 and the channel region 410. The gate insulating layer 414 may be formed of one or more dielectric materials, such as metal oxide including oxides of Li, Be, Mg, Ca, Sr, Sc, Y, Zr, Hf, Al, La, Ce, Pr, Nd, Sm, Eu, Gd, Tb, Dy, Ho, Er, Tm, Yb, Lu, and the like.

In some embodiments, a width WNP of the well region 403 in the column direction corresponds to the width WN or width WP of the respective active regions NOD or POD in the column direction. Further, FIG. 10 shows a width WF of each of the fin structures 404A and 404B in the column direction. In some embodiments, the width of a certain active region NOD or POD in the column direction is associated with the number of active fin structures arranged therewithin. In some embodiments of the FinFET device, an N-type or P-type active region is a region having a shape of a polygon including the active fin structures, and a nominal width of this active region in the column direction is equal to a width of its corresponding active region in the column direction for a planar FET device, in which the nominal width may be based in part on the portion of the isolation structures STI between the active fin structures. Alternatively, an effective width of this active region in the column direction is determined according to a width sum of the active fin structures formed within the respective active region, and the widths of isolation structures STI between the active fin structures are not taken into consideration.

In some embodiments, an effective width WP or WN of the respective P-type active region POD or N-type active region NOD is the width sum, in the column direction, of the two fin structures AF1, AF2 within the respective active region. In embodiments where the fin structures AF1, AF2 have substantially equal widths WF, the effective width WP of the P-type active region POD in the column direction is 2×WF. As such, a width of an N-type or P-type active region containing fin structures AF1, AF2 is alternatively defined as the width sum of the active fin structures within the respective active region NOD or POD, or defined as the number of fin structures AF1, AF2 within the respective active region multiplied by the width of one fin structure given the assumption of equal widths among the fin structures.

In some embodiments, referring back to FIG. 9, cells SC1, SC2, SC3 and SC4 are placed in the layout portion 310z and disposed within the rows R1 to R3. The cells SC1 through SC4 are interconnected together and configured to performed specific functions.

In some embodiments, the cells SC1 through SC4 are cells and arranged in the rows R1 to R3. Each of the cells SC1 through SC4 has a cell height equal to one row height and includes a P-type active region POD and an N-type active region NOD, in which the order of the two active regions POD and NOD may be different in different cells. The locations of the cells SC1 through SC4 are for illustrative purposes only. One of ordinary skill in the art should understand that the layout portion 310z may include one or more cells arranged in one row.

The sizes of the cells SC1 through SC4 are defined by their respective cell boundaries, for example, the cell boundary of the cell SC1 includes an upper cell side CB1 and a lower cell side CB2 (both extending in the row direction) and a left cell side CB3 and a right cell side CB4 (both extending in the column direction). The cells SC1 through SC4 may be separated from one another or share at least one cell side.

In some embodiments, the cell lengths measured in the row direction is determined according to design requirements and each cell SC1 through SC4 may have the same or different cell lengths. In some embodiments, the cell height of the cell is determined based on the row height of the row in which the cell resides. Taking the cell SC1 as an example, the cell height CH1 of the cell SC1 is determined based on the row height of the row R1. In some embodiments, the cell height CH1 is determined based on a pitch between the lower first power rail V1 and the upper second power rail V2. In some embodiments, the cell height CH1 is equal to the row height of the first row R1 in which the cell SC1 resides.

Each of the cells SC1 through SC4 includes various features. Taking the cell SC1 as an example, the cell SC1 includes two gate GT1 and GT2, active regions NOD1 and POD1, two fins AF1, AF2 in each of the active regions NOD1 and POD1, respectively, and two power rails V1 and V2 on opposite sides of the cell SC1. The power rails V1 and V2 of the portion 310z are electrically coupled to the features of the cell SC1, such as the gate GT1 and GT2 and the active regions NOD1 and POD1, including the fins AF1 and AF2. The abovementioned features, e.g., GT3, GT4, NOD1, POD1, VV1, VV2, AF1 and AF2, of the cell SC1 are configured to coincide with the corresponding features, e.g., GT1, GT2, NOD, POD, V1, V2, AF1 and AF2, of the layout portion 310z that are predefined when the design layout 300 is generated. In some embodiments, similar features, such as the gates GT1 and GT2, the fins AF1 and AF2, and the power rail V1, of different cells may be configured using the same corresponding features of the layout portion 310z, and thus inherit the predefined configurations of these features of the layout portion 310z.

In some embodiments, the P-type active region POD1 and the N-type active region NOD1 of the cell SC1 have substantially equal widths in the column direction, i.e., WP=WN. Similarly, the P-type active region POD2 and the N-type active region NOD2 of the cell SC2 have substantially equal widths in the column direction. In some embodiments, the widths WP or WN are each related to the cell height of the respective cell. In some embodiments, the P-type active region POD and the N-type active region NOA have equal numbers of the fins. The power rails V1 and V2 of the portion 310z are electrically coupled to the features of the cell SC2, such as the gate GT1 and GT2 and the active regions NOD2 and POD2.

In some embodiments, referring to FIG. 9 and FIG. 10, each of the cells SC1 through SC4 shown in FIG. 9 includes the FinFET device 400 illustrated in FIG. 10. In some embodiments, each of the cells SC1 through SC4 has the same width WNP of the well region 403 in the column direction or the same number of fin numbers. In some embodiments, each of the cells SC1 through SC4 has the same widths WF of the fin structure 404A or 404B in the column direction. In some embodiments, each of the cells SC1 through SC4 has the same fin height FH of the fin structure 404A or 404B in the column direction. In some embodiments, each of the cells SC1 through SC4 has the same gate width GW of the gate electrode 412 in the column direction. In some embodiments, each of the cells SC1 through SC4 has the same gate height GH of the gate electrode 412.

Referring back to FIG. 3, in some embodiments, the second component 320 has a similar layout configuration to the layout portion 310z of the first component 310 shown in FIG. 9. In some embodiments, the second component 320 includes a FinFET device similar to the FinFET device 400 of the first component 310 as illustrated in FIG. 10.

Referring to FIGS. 2A and 3, in step 204, a third zone 36 of the design layout 300 adjacent to the first zone 31 and the second zone 32 is identified, and a third component 360 comprising a third cell is placed in the third zone 36. In some embodiments, the buffer zone 330 is the spaces left out by the first zone 31, the second zone 32 and the third zone 36 from a top-view perspective. In some embodiments, a portion of the buffer zone 330 separates the third zone 36 from the first zone 31 and the second zone 32. In some embodiments, the third component 360 is disposed adjacent to one of the first component 310 and the second component 320. In some embodiments, a portion of the buffer zone 330 separates the third component 360 from the first component 310 and the second component 320.

In some embodiments, steps 202 to 204 are performed sequentially. In some embodiments, the steps of defining the third zone 36 and step 202 are performed simultaneously. In some embodiments, the steps of placing the third component 360 and step 203 are performed simultaneously.

In step 204, the third cell comprising a third capacitor from a cell library is selected. In some embodiments, the third capacitor is a decoupling capacitor. In some embodiments, the cell library is obtained through the library of step 132 as shown in FIG. 1. The third cell has a fifth cell configuration different from the first cell configuration and the second cell configuration.

In the present embodiment shown in FIG. 3, only three components 310, 320 and 360 are shown in FIG. 3. However, other embodiments with less than or more than three components are also possible. A person ordinarily skilled in the art would readily understand that any suitable number of components may alternatively be utilized, and all such combinations are fully intended to be included within the scope of the embodiments. In some embodiments, the step 204 is optional and the placement of the third component 360 may be omitted.

Referring to FIG. 1 and FIG. 2A, in some embodiments, the placement and routing stage 150 is performed by proceeding with steps 201 through 204 in FIG. 2A. In some embodiments, the step 205 of FIG. 2A is performed only after it is determined in the stage 170 of FIG. 1 that the first component 310, the second component 320 and the third component 360 fulfill the system specification set forth for the design layout 300.

Figure 4:
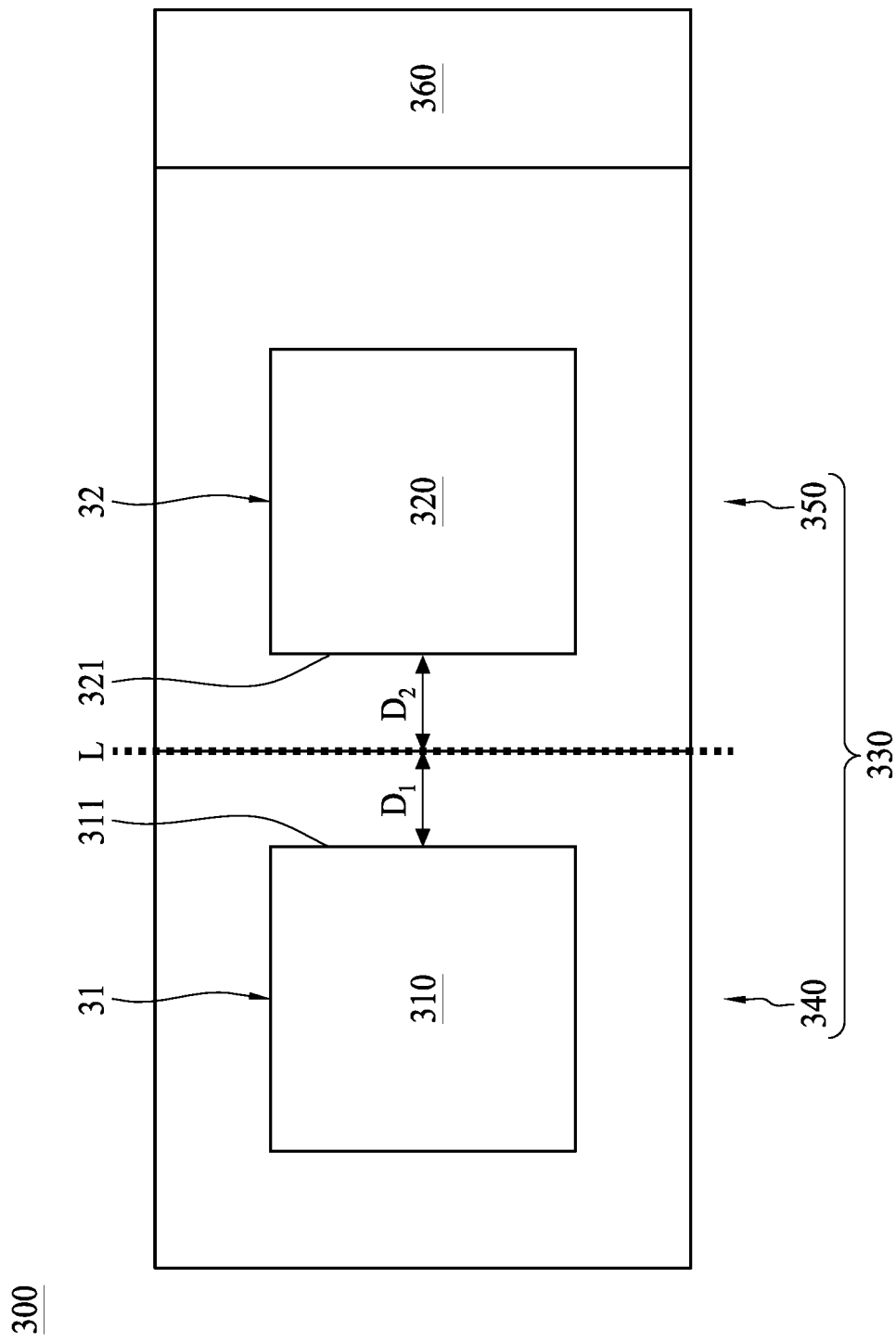

Subsequently, the design flow 100 loops back to the placement and routing stage 150 by proceeding with the steps 205 to 213 of FIGS. 2A and 2B. Referring to FIGS. 2A and 4, in step 205, a line L between the first zone 31 and the second zone 32 is provided. The line L is drawn in the buffer zone 330 and configured to define a first area 340 and a second area 350. The first area 340 and the second area 350 are determined such that all unused spaces of the design layout 300 left out by the first component 310 and the second component 320 are allocated to the first area 340 and the second area 350. In some embodiments, the line L is drawn between a first side 311 of the first component 310 and a second side 321 of the second component 320 facing the first side 311. In some embodiments, the first component 310 and the second component 320 are arranged on the opposite sides of the line L.

In some embodiments, the line L is linear or a straight line as shown in FIG. 4. In some embodiments, a first distance D1 between the line L and the first side 311 of the first component 310 is equal to a second distance D2 between the line L and the second side 321 of the second component 320. In some embodiments, the line L is equidistant between the first component 310 and the second component 320. In some embodiments, the first distance D1 is different from the second distance D2.

Figure 5:
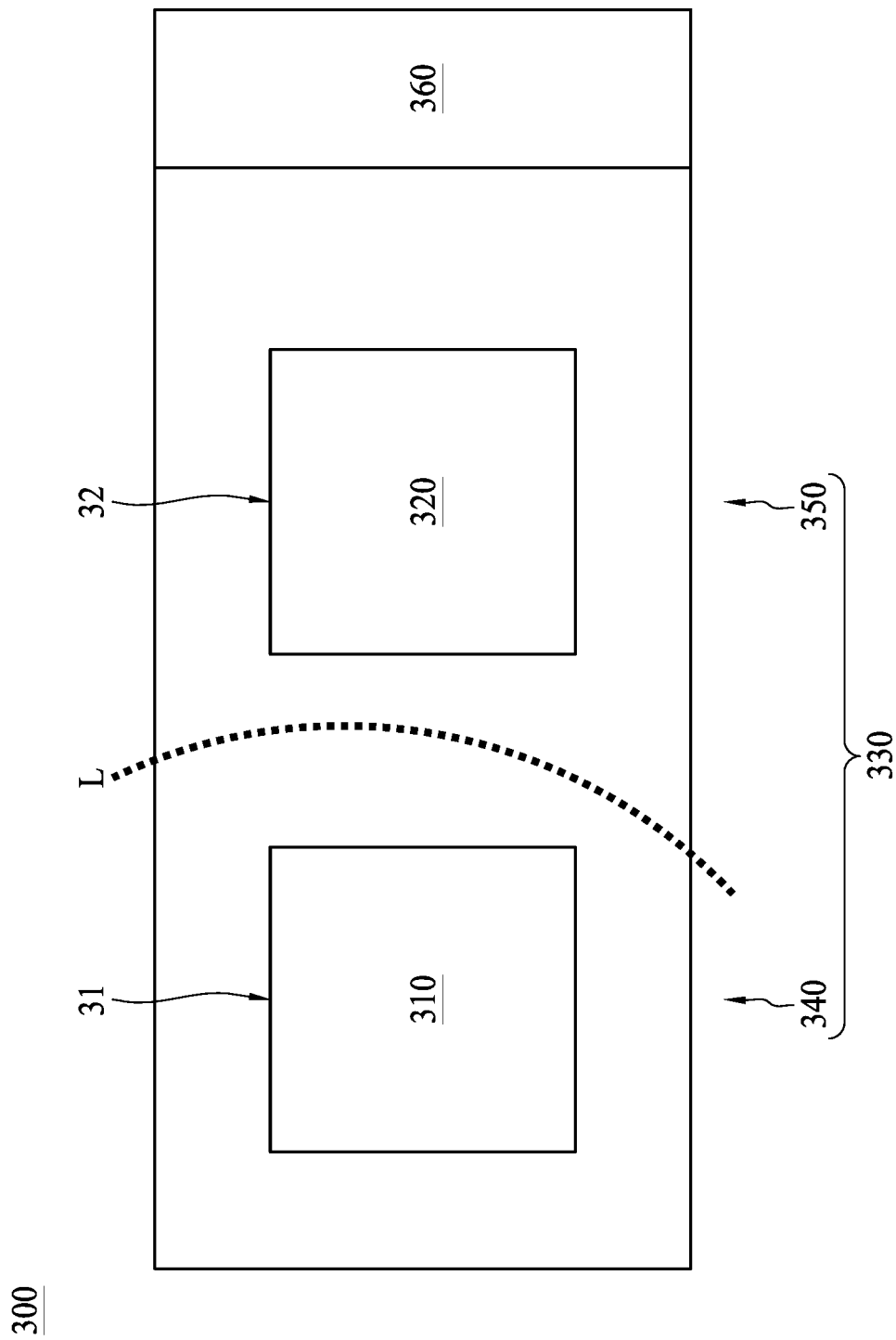
Figure 6:
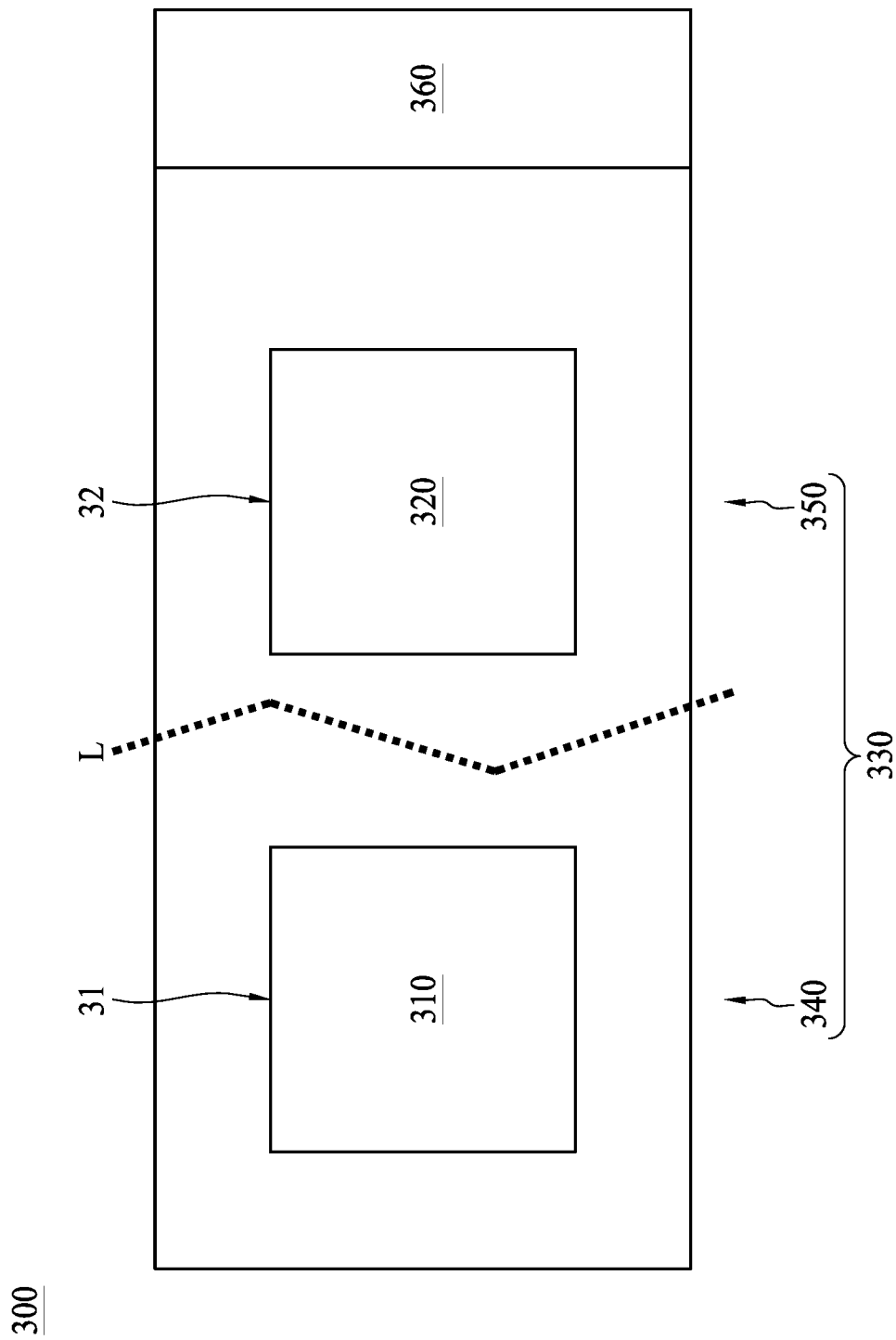
Figure 7:
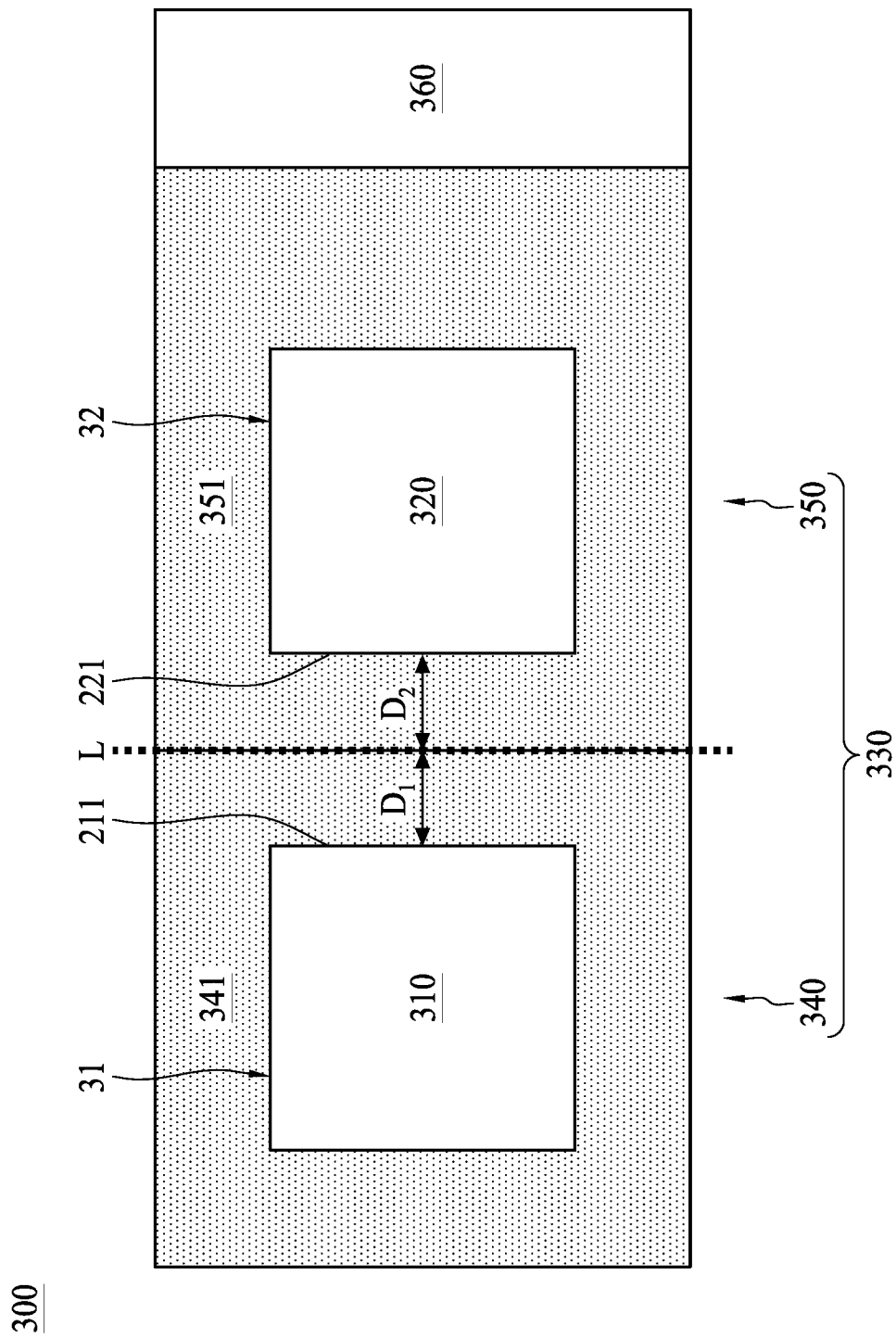

In some embodiments, the line L is a curved line as shown in FIG. 5. In some embodiments, the line L is jagged or irregular as shown in FIG. 6. The configuration of the line L is not intended to be limiting and other configurations or shapes of the line L are within the contemplated scope of the present disclosure.

Referring back to FIGS. 2A and 4, in step 206, the first area 340 and the second area 350 between the first component 310 and the second component 320 are defined. In some embodiments, the first area 340 is defined by the line L and the first component 310. In some embodiments, at least a portion of the first area 340 is defined between the line L and the first side 311 of the first component 310. In some embodiments, the first area 340 includes regions of the buffer zone 330 adjacent to the first component 310. In some embodiments, the first area 340 includes regions of the buffer zone 330 surrounding the first component 310. The shape of the first area 340 is not particularly limited and can be adjusted according to application requirements. In some embodiments, the first area 340 is in a shape of a ring surrounding the first component 310 from a top-view perspective. In some embodiments, the first area 340 is in a shape of a bar or a line adjacent to the first component 310 from a top-view perspective.

In some embodiments, at least a portion of the first area 340 is disposed between the first component 310 and the second component 320. In some embodiments, the first area 340 separates the first component 310 from the second component 320 or the second area 350. In some embodiments, the first area 340 is in contact with the second area 350. The first area 340 may laterally surround the first component 310. The first area 340 may be arranged in a ring shape. In some embodiment, the first area 340 is in contact with the periphery of the first component 310 from a top-view perspective.

In some embodiments, the second area 350 is defined by the line L and the second component 320. In some embodiments, at least a portion of the second area 350 is defined between the line L and the second side 321 of the second component 320. In some embodiments, the second area 350 includes regions of the buffer zone 330 adjacent to the second component 320. In some embodiments, the second area 350 includes regions of the buffer zone 330 surrounding the second component 320. In some embodiments, the first area 340 and the second area 350 are symmetrical with respect to the line L.

In some embodiments, at least a portion of the second area 350 is disposed between the first component 310 and the second component 320. In some embodiments, the second area 350 separates the second component 320 from the first area 340 or the first component 310. The second area 350 may laterally surround the second component 320. The second area 350 may be arranged in a ring shape from a top-view perspective. In some embodiment, the second area 350 is in contact with the periphery of the second component 320 from a top-view perspective.

In some embodiments, the sizes of the first area 340 and the second area 350 are finalized and will not be altered only after each of the functional components in the design layout 300, e.g., the first component 310 and the second component, has passed the post-layout simulation performed in the stage 170 and meets the system specification. In some embodiments, if it is determined in stage 170 of FIG. 1 that further modifications are required on the first components 310, second components 320 and the third components 330, the design flow 100 may proceed with step 185 to perform the ECO operations, which may consume additional areas. The sizes of the first area 340 and the second area 350 will be determined after the ECO operations are completed.

In step 207, a first cell configuration of the first component 310 and a second cell configuration of the second component 320 are determined. In some embodiments, each of the first cell configuration and the second cell configuration includes dimensions of the features of the first components 310 or the second components 320, e.g., a gate width, a gate density, a gate height, a gate width, a fin height, a fin width, a fin pitch, a power rail density, a cell length, a row height, a cell height, a spacing between the gate electrodes, a spacing between the active regions, and a width of an active region as mentioned above with reference to FIG. 9 and FIG. 10.

In step 208, a first cell array 341 formed of a same type of the cell selected from the cell library. In some embodiments, the cell library is obtained through the library 132 shown in FIG. 1. The identical cells in the first cell array 341 have a third cell configuration according to the first cell configuration of the first component 310. The third cell configuration of the first cell array 341 may be identical to the first cell configuration of the first component 310. The cell configuration of the first cell array 341 may be closer to the first cell configuration of the first component 310 than the second cell configuration of the second component 320.

Existing methods regard the first area 340 as unused areas of the design layout 300, in which these unused areas are only employed to provide buffering regions between functional areas, such as the first component 310 and the second component 320. The area of the unused area in some existing embodiments may be about 10% to about 20% of the total area of the design layout 300. Therefore, dummy devices, which neither include any active/passive devices nor serve any specific circuit functions, are used to fill these unused areas for convenience of manufacturing the semiconductor device.

Instead of filling dummy devices in the first area 340 as seen in some existing methods, the cells in the first cell array 341 serve specific functions to the electronic circuit manufactured according to the design layout 300. In some embodiments, the cells in the first cell array 341 include decoupling capacitors and are configured to improve voltage or current stability of the first component 310 and the second components 320, or configured to reduce the noise of the design layout 300. In some embodiments, the cell in the first cell array 341 is formed of a decoupling capacitor. As a result, the circuit area utilization is improved and the matched cell configurations used in the first component 310 and the first area 340 will enhance the manufacturing performance of the semiconductor device, as will be explained in greater detail later.

In some embodiments, a cell height of the cell of the first cell array 341 is substantially equal to the cell height of the cells e.g., SC1 through SC4, of the first component 310. In some embodiments, a row height of the cell of the first cell array 341 is substantially equal to the row height of cell SC1 of the first component 310. In some embodiments, a gate pitch and a fin of the cell of the first cell array 341 is substantially equal to the gate pitch GP and the fin pitch FP, respectively, of the cell SC1 of the first component 310. In some embodiments, a cell length of the cell of the first cell array 341 is substantially equal to the cell length of the cell SC1 of the first component 310.

In some embodiments, each of the cells of the first cell array 341 includes active regions identical to that of the cell SC1 of the first component 310. In some embodiments, a width of an active region of the cell of the first cell array 341 is identical to one of the width of the active regions WP or NP of the cell of the first component 310. In some embodiments, a P-type active region and a N-type active region of the cell of the first cell array 341 have substantially equal widths in a column direction. In some embodiments, a spacing in the row direction between adjacent segments of the active regions of the cell of the first cell array 341 is identical to the spacing $S_{POD}$ or $S_{NOD}$ of one of the cells SC1 through SC4 of the first component 310. In some embodiments, the cell of the first cell array 341 further includes one or more gate electrode disposed in the active region, the configuration of the gate electrode of the cell of the first cell array 341 is identical to the gate electrodes GT1, GT2 of the cell SC1 of the first component 310. In some embodiments, a gate width of the cell of the first cell array 341 is identical to the gate width of one of the cells SC1 through SC4 of the first component 310. In some embodiments, a gate density of the cell of the first cell array 341 is identical to the gate density of one of the cells SC1 through SC4 of the first component 310. In some embodiments, a spacing in the column direction between the gate electrodes of the cell of the first cell array 341 is identical to the spacing $S_{G1}$ or $S_{G2}$ of one of the cells SC1 through SC4 of the first component 310. In some embodiments, a power rail density of the cell of the first cell array 341 is identical to the power rail density of one of the cells SC1 through SC4 of the first component 310. In some embodiments, a gate height of the cell of the first cell array 341 is identical to the gate height of one of the cells SC1 through SC4 of the first component 310.

In some embodiments, each of the cells of the first cell array 341 includes a FinFET device, which may be identical to the FinFET device of the first component 310 illustrated in FIG. 10. In some embodiments, a width of a fin structure of the cell of the first cell array 341 is identical to the width WF of each of the fin structures 404A and 404B in the column direction of the cell SC1 of the first component 310. In some embodiments, a width of the well region 403 in the column direction of the cell of the first cell array 341 is identical to a width WNP of the well region 403 in the column direction of the FinFET device 400 of the first component 310. In some embodiments, a height of a fin structure of the cell of the first cell array 341 is identical to the fin height FH of each of the fin structures 404A and 404B in the column direction of the first component 310.

Figure 11:
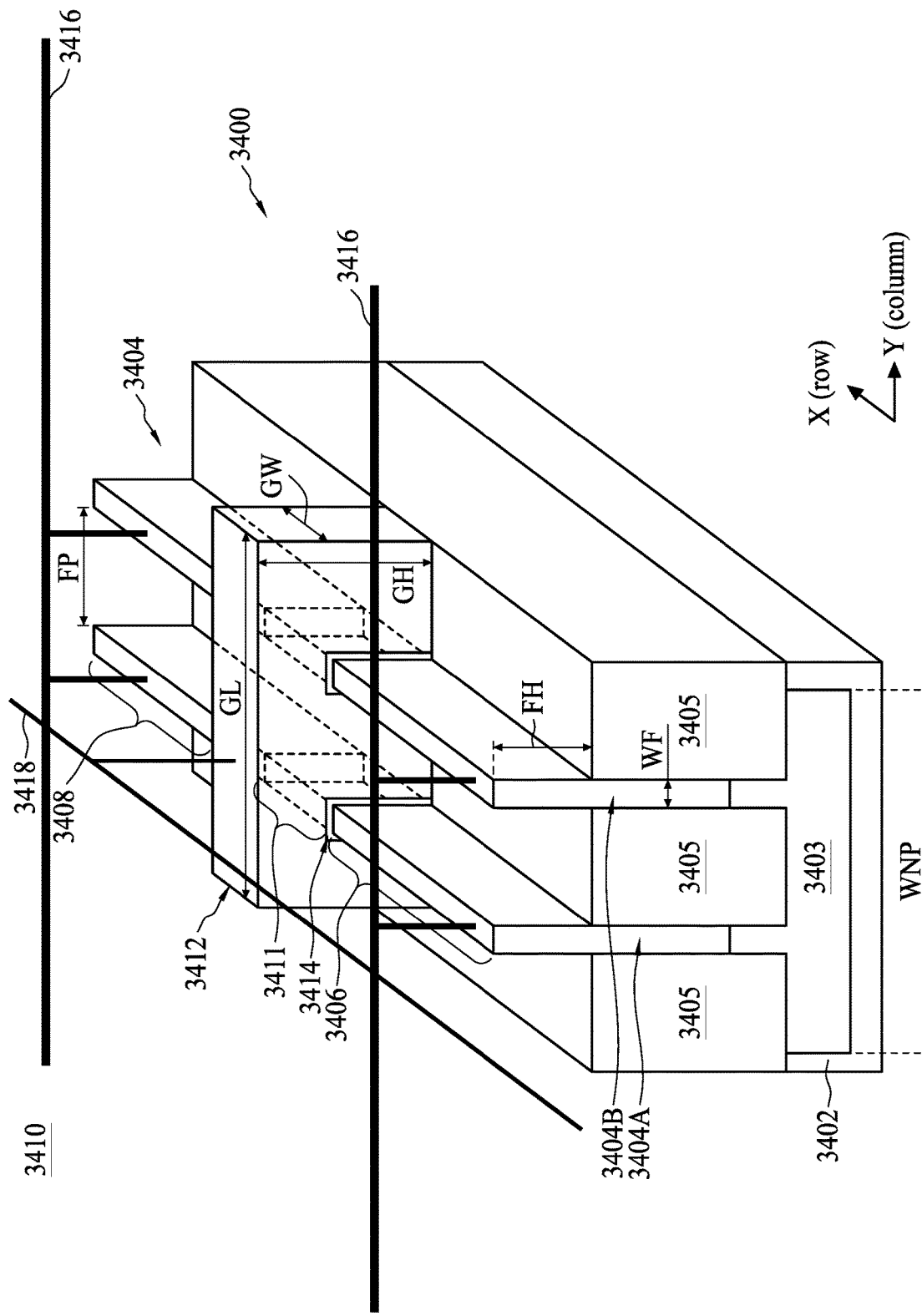
FIG. 11 is a perspective view of a decoupling capacitor, in accordance with some embodiments of the present disclosure.

FIG. 11 is a perspective view of a decoupling capacitor 3410, according to some embodiments of the present disclosure. Referring to FIG. 11, the decoupling capacitor 3410 includes a FinFET device 3400 and metal lines 3416, 3418. In some embodiments, the FinFET device 3400 and the FinFET device 400 illustrated in FIG. 10 have substantially identical cell configurations, e.g., the first cell configuration of the first component 310.

The FinFET device 3400 includes a substrate 3402, two exemplary fin structures 3404 (e.g., fin structures 404A and 404B), and an isolation structure 405. Each of the fin structures 3404A and 3404B includes a source region 3406, a drain region 3408 and a channel region 3411 interposed between the source region 3406 and the drain region 3408. In some embodiments, a doped region 3403 is formed in the substrate 3402 below the isolation structure 3405.

A gate electrode 3412 is formed over the fin structures 3404A and 3404B. The gate electrode 3412 extends to cover sidewalls of the channel region 3411 and portions of the isolation structure 3405. The FinFET device 3400 also includes a gate insulating layer 3414 between the gate electrode 3412 and the channel region 3411.

In some embodiments, the fin structures 3404A and 3404B are inter-connected, and are electrically connected to the metal line 3416. In some embodiments, the gate electrode 3412 is electrically connected to the metal line 3418. Accordingly, the decoupling capacitor 3410 is formed. In some embodiments, the gate electrode 3412 acts as one capacitor plate of the decoupling capacitor 3410, and the fin structures 3404A and 3404B act as the other capacitor plate of the decoupling capacitor 3410 with the gate insulating layer 3414 acting as the insulator of the decoupling capacitor 3410.

FIG. 2B is in continuation with FIG. 2A and shows the steps 209 through 213 of the method 200. In step 209, a second cell array 351 comprising one or more cell selected from the cell library. In some embodiments, the cell library is obtained through the library 132 shown in FIG. 1. The cells in the second cell array 351 have a fourth cell configuration identical to the second cell configuration of the second component 320. The relationship between the second cell configuration and the fourth cell configuration are similar to the relationship between the first cell configuration and the third cell configuration, and thus similar descriptions will not be repeated herein.

The fourth cell configuration of the second cell array 351 may be identical to the second cell configuration of the second component 320. The cell configuration of the second cell array 351 may be closer to the second cell configuration of the second component 320 than the first cell configuration of the first component 310. In some embodiments, step 208 and step 209 are performed sequentially. In some embodiments, step 208 and step 209 are performed simultaneously. In some embodiments, step 202 to step 209 of the method 200 is performed in the placement and routing operation of step 150 shown in FIG. 1.

The cells in the second cell array 351 serve functions to the electronic circuit manufactured according to the design layout 300, e.g., the decoupling capacitors of the second cell array 351 are configured to improve voltage or current stability of the second component 310 and the second components 320, or configured to reduce the noise of the design layout 300. In some embodiments, the cells in the second cell array 351 are formed of a decoupling capacitor.

In step 210, a first cell array 341 is placed in the first area 340. In some embodiments, step 210 is performed in the placement and routing operation of step 150 shown in FIG. 1. The first cell array 341 is placed adjacent to the first component 310. In some embodiments, the placement of the first cell array 341 further comprises electrically connecting the first cell array 341 to the one or more power rails (not shown).

The placement of the first cell array 341 implements the third cell configuration, which is identical to the first cell configuration of the adjacent first component 310, in order to suppress the density gradient effect (DGE) and the loading effect, and isolate noise during subsequent semiconductor processing. Further, and the decoupling capacitors of the first cell array 341 are utilized to improve the electrical stability performance of the first component 310 and the second components 320.

The term "density gradient effects (DGE)" used herein refers to a non-uniform density of components in a semiconductor device. The DGE usually occurs at an interface between different types of blocks of a circuit or at an interface between a peripheral region of a block and its surrounding unused regions. IC design layout aims to reduce interference as much as possible, and to maintain performance of circuit components within desired parameters. In some embodiments, the performance of advanced patterning and etching processes are affected by DGE associated with the particular IC device layout configuration being manufactured. Consideration and adjustment of the relative placement, height, and density of the functional and non-functional structures during IC device layout mitigate some of the DGE and improve the uniformity and performance of the resulting semiconductor device.

The performance of a semiconductor manufacturing process, e.g., a planarization operation in stage 195 shown in FIG. 1, may be different in the components with different cell configurations, and thus the process uniformity and reliability may be degraded. Placing transition cells between functional components in the design layout in accordance with some embodiments will reduce the DGE and improve production yield. In accordance with some embodiments, transition cells are designed to compensate for the variations between various types of component configuration in a design layout. Incorporating specifically designed transition cells according to some embodiments smooth out feature mismatch across different components, e.g., with regard to at least one of a gate width, a gate density, a gate height, a fin density, a fin height or a power rail density, between adjacent components and blocks, and thus improve the surface uniformity of the planarization operation.

Therefore, by causing cell configuration of the first area 340 to be close or identical to that of the adjacent first component 310, the DGE resulting from mismatched cell configurations may be relieved. Further, the complexity of manufacturing processes of the semiconductor device according to the design layout 300 is reduced and the production yield is improved over existing approaches. Since the manufacturing parameters for forming the first and second cell configurations of the first and second components 310, 320, respectively, are already available, reusing these parameters in the buffer zone 330 can also save processing time and cost.

In step 211, a second cell array 351 formed of the second cell is placed in the second area 350. In some embodiments, step 211 is performed in the placement and routing operation of step 150 as shown in FIG. 1. The second cell array 351 is adjacent to the second component 320, and the fourth cell configuration of the cell of the second cell array 351 is identical to the second cell configuration of the second component 320. In some embodiments, the placement of the second cell array 351 further comprises electrically connecting the second cell array 351 to the one or more power rails (not shown).

Similarly, the placement of the second cell array 351 implements the third cell configuration, which is identical to the second cell configuration of the adjacent second component 320, in order to suppress DGE during subsequent semiconductor processing, and similar details are not repeated herein. In some embodiments, the second component 320 is electrically isolated from the second area 350. In some embodiments, the first cell array 341 in the first area 340 and the second cell array 351 in the second area 350 are electrically isolated from each other. In some embodiments, each of the cells of the second cell array 351 includes a second capacitor. In some embodiments, the second capacitor is a decoupling capacitor. In some embodiments, the cell of the second cell array 351 is evenly distributed in the second area 350.

The step 210 of placing the first cell array 341 and the step 211 of placing the second cell array 351 may be performed separately or simultaneously.

In some embodiments, only one of the first cell array 341 and the second cell array 351 is disposed in the buffer zone 330. In some embodiments, the area of the first component 310 is greater than the second component 320, and the buffer zone 330 is occupied by the first cell array 341, which surrounds the first component 310 and the second component 320. Similarity, in some embodiments, the area of the second component 320 is greater than the first component 310, and the buffer zone 330 is occupied by the second cell array 351, which surrounds the first component 310 and the second component 320.

In some embodiments, in order to mitigate the DGE of the layout 300, the third cell configuration may be determined to be identical or close to the first cell configuration with respect to a subset of the first/third cell configurations. For example, a subset including the gate pitch/density and/or the fin pitch/density, is determined to be identical to the parameters in the corresponding subset, which includes at least one of the gate density, the fin density and the power rail density, of the first cell configuration, while the settings of the items not included in the subset may be different between the cells in the first component and the cell array 341.

Figure 8:
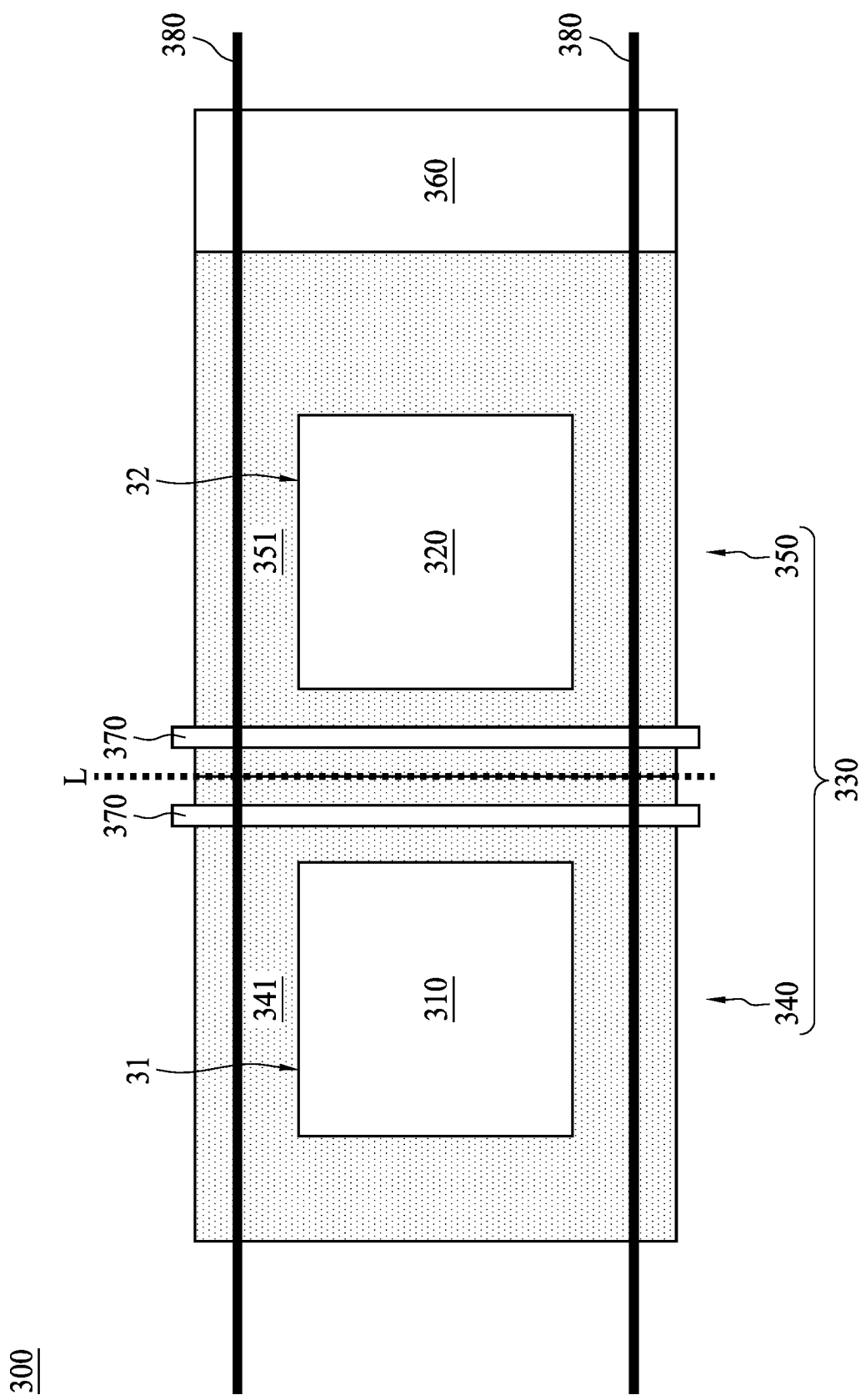

Referring to FIG. 2 and FIG. 8, in step 212, a mental line 370 is formed above the first area 340 or the second area 350 to electrically couple to the first cell array 341 or the second cell array 351. In some embodiments, a plurality of the mental lines 370, 380 are disposed above the first area 340 and the second area 350. In some embodiments, the metal lines 370, 380 extend alone different directions. In some embodiments, the mental line 370 may correspond to the metal line 3418 in FIG. 11, In some embodiments, the mental line 380 may correspond to the metal line 3416 in FIG. 11.

In some embodiments, the plurality of metal lines 370 includes one or more power rails extended in the row direction or the column direction in different layers over the semiconductor devices 300 of the first component 310, second component 320, first cell array 341 and the second cell array 351. The power rails are electrically coupled to each of the first component 310, second component 320, first cell array 341 and the second cell array 351 for conveying power. Although not separately shown in the figures, the power rails may extend across the regions occupied by the first component 310, second component 320, first cell array 341 and the second cell array 351. In some embodiments, the power rails is distributed across the entire region of the design layout 300, in contrast to existing design layout in which the power rails are only present in the functional components rather than the buffer zone.

In step 213, a semiconductor device is manufactured according to the design layout. In some embodiments, step 213 is performed within the photomask generation operation of step 190 and the circuit fabrication of step 195 as shown in FIG. 1.

Referring to FIG. 1 and FIG. 2B, in some embodiments, after the step 212 and before the step 213, it is determined in the stage 170 of FIG. 1 that the whether the first cell array 341 and the second cell array 351 fulfill the system specification set forth for the design layout 300. In some embodiments, the step 213 of FIG. 2B is performed only after it is determined in the stage 170 of FIG. 1 that the first cell array 341 and the second cell array 341 fulfill the system specification set forth for the design layout 300.

Figure 12:
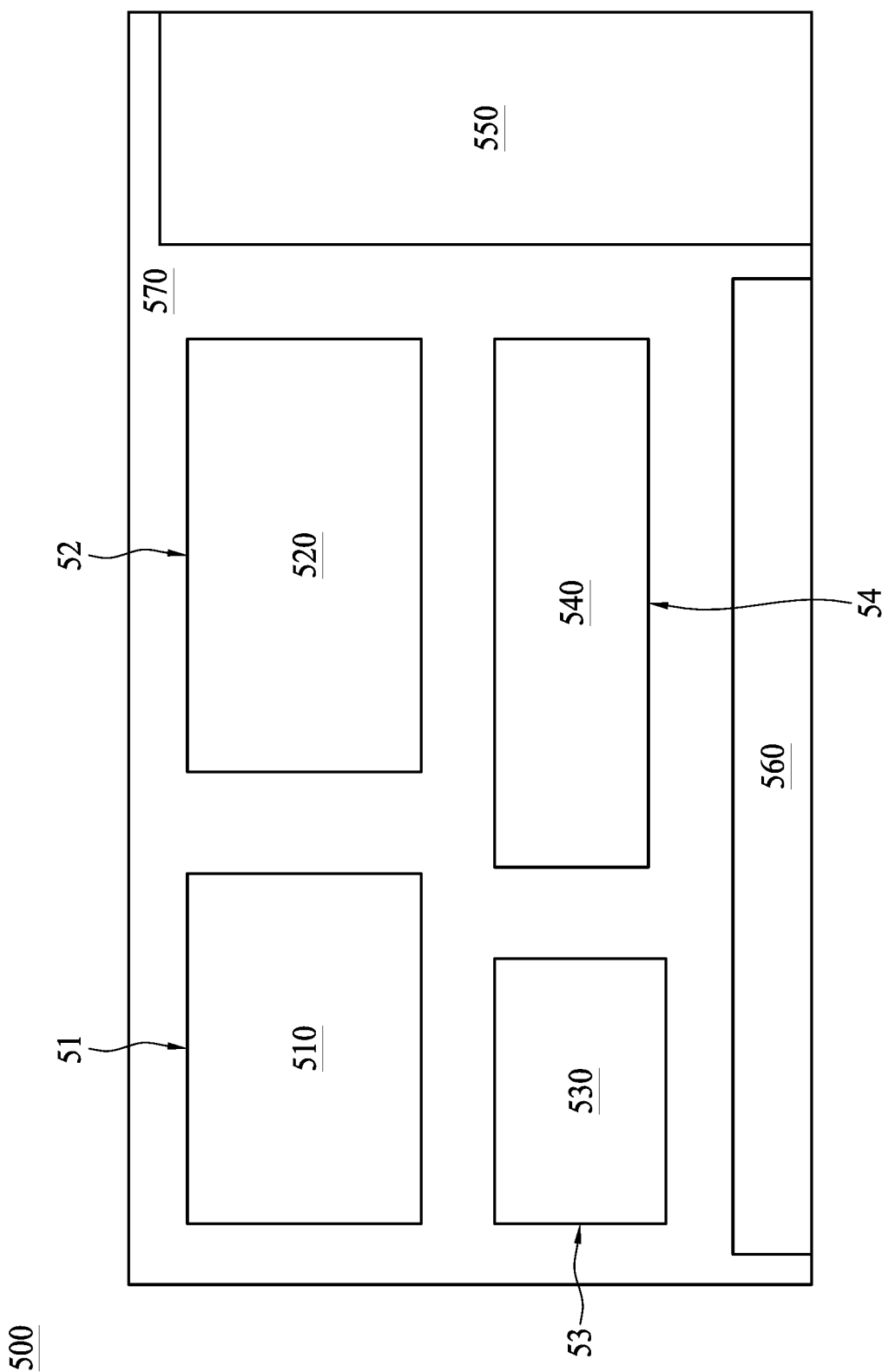
FIGS. 12 to 14 are schematic diagrams illustrating exemplary operations in a method of manufacturing a semiconductor device, in accordance with some embodiments of the present disclosure.

Referring to FIG. 12, in some embodiments, a design layout 500 according to the circuit design is generated. In some embodiments, the design layout 500 defines a first zone 51, a second zone 52, a third zone 53 and a fourth zone 54 separated from each other. In some embodiments, a first component 510 is placed in the first zone 51. Likewise, a second component 520 is placed in the second zone 52, a third component 520 is placed in the third zone 53, and a fourth component 540 is placed in the fourth zone 54. In some embodiments, each of the first component 510, the second component 520, the third component, and the fourth component 540 is formed of one or more cells, wherein the respective cells correspond to specific electronic circuits.

The cells in the first component 510 have a sixth cell configuration, and the cells in the second component 520 have a seven cell configuration. The cells in the third component 530 have an eight cell configuration, and the cells in the fourth component 540 have a ninth cell configuration. The sixth cell configuration, the seventh cell configuration, the eighth cell configuration and the ninth cell configuration may be different from each other.

A fifth zone 55 and a sixth zone 66 of the design layout 500 are identified adjacent to the first zone 51 to the fourth zone 54, respectively. A fifth component 550 comprising a plurality of a fifth capacitor is placed in the fifth zone 55, and a sixth component 560 comprising a plurality of a sixth capacitor is places in the sixth zone 560. In some embodiments, each of the fifth cell and the sixth capacitors includes a decoupling capacitor.

In some embodiments, the buffer zone 570 is the spaces left out by the first zone 51, the second zone 52, the third zone 53, the fourth zone 54, the fifth zone 55, and the sixth zone 56 from a top-view perspective. In some embodiments, a portion of the buffer zone 570 separates the fifth zone 55 and the sixth zone 56 from the first zone 51, the second zone 52, the third zone 53, and the fourth zone 54.

Figure 13:
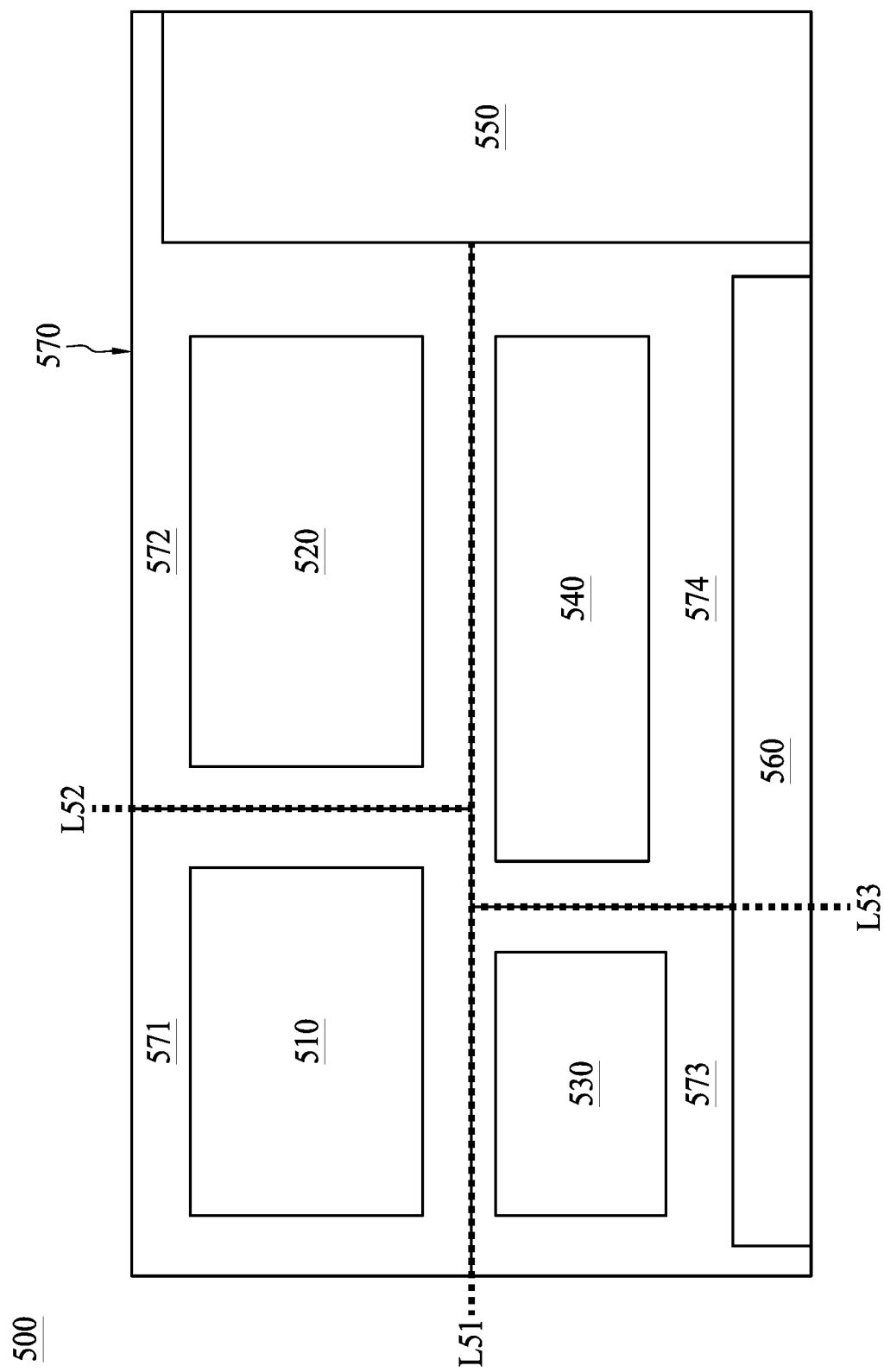

Referring to FIG. 13, in some embodiments, a line L51 is provided between the first component 510 and the third component 530 and between the second component 520 and the fourth component 540. In some embodiments, a line L52 between the first is provided 510 and the second is provided 520 is provided, and a line L53 between the third is provided 530 and the fourth is provided 540 is provided. In some embodiments, the line L51, the line L52 and the line L53 are defined sequentially. In some embodiments, the line L51, the line L52 and the line L53 are defined simultaneously. In some embodiments, the line L51 is defined before the line L52 or the line L53.

In some embodiments, a first area 571 is determined to be adjacent to the first component 510. In some embodiments, the first area 571 is defined by the line L51 and the line L52 and surrounds the first component 510. In some embodiments, a second area 572 is determined as be adjacent to the second component 520. In some embodiments, the second area 572 is defined by the line L51 and the line L52 and surrounds the second component 520. In some embodiments, the second area 572 is adjacent to the fifth component 550.

In some embodiments, a third area 573 is determined to be adjacent to the third component 530. In some embodiments, the third area 573 is defined by the line L51 and the line L53 and surrounds the third component 530. In some embodiments, the third area 573 is adjacent to the sixth component 560. In some embodiments, a fourth area 574 adjacent to the fourth component 540. In some embodiments, the fourth area 574 is defined by the line L51 and the line L53 and surrounds the fourth component 540. In some embodiments, the fourth area 574 is adjacent to the sixth component 560.

Figure 14:
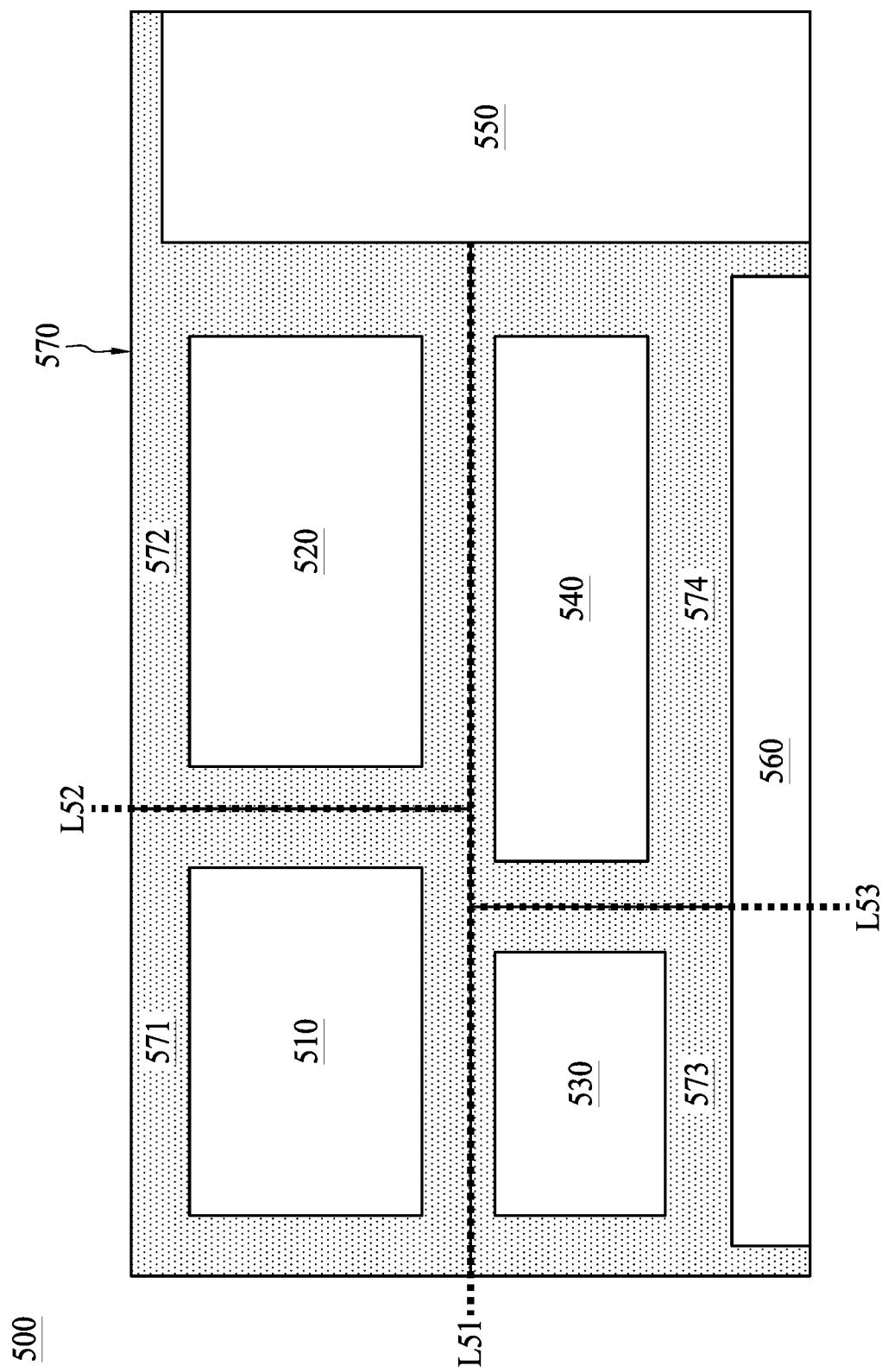

Referring to FIG. 14, in some embodiments, in order to suppress DGE during subsequent semiconductor processing, the first area 571 includes an array of a cell having a cell configuration identical to the have a sixth cell configuration of the first component 510. Similarity, in some embodiments, the second area 572 includes an array of a cell having a cell configuration identical to the have a seventh cell configuration of the second component 520. In some embodiments, the third area 573 includes an array of a cell having a cell configuration identical to the have an eighth cell configuration of the third component 530. In some embodiments, the fourth area 574 includes an array of a cell having a cell configuration identical to the have a ninth cell configuration of the fourth component 540.

The method of manufacturing the semiconductor device 500 is are similar to the method 200 and steps of manufacturing the semiconductor device 300 illustrated in FIG. 2A, 2B to FIG. 8, and thus similar descriptions will not be repeated herein.

Figure 15:
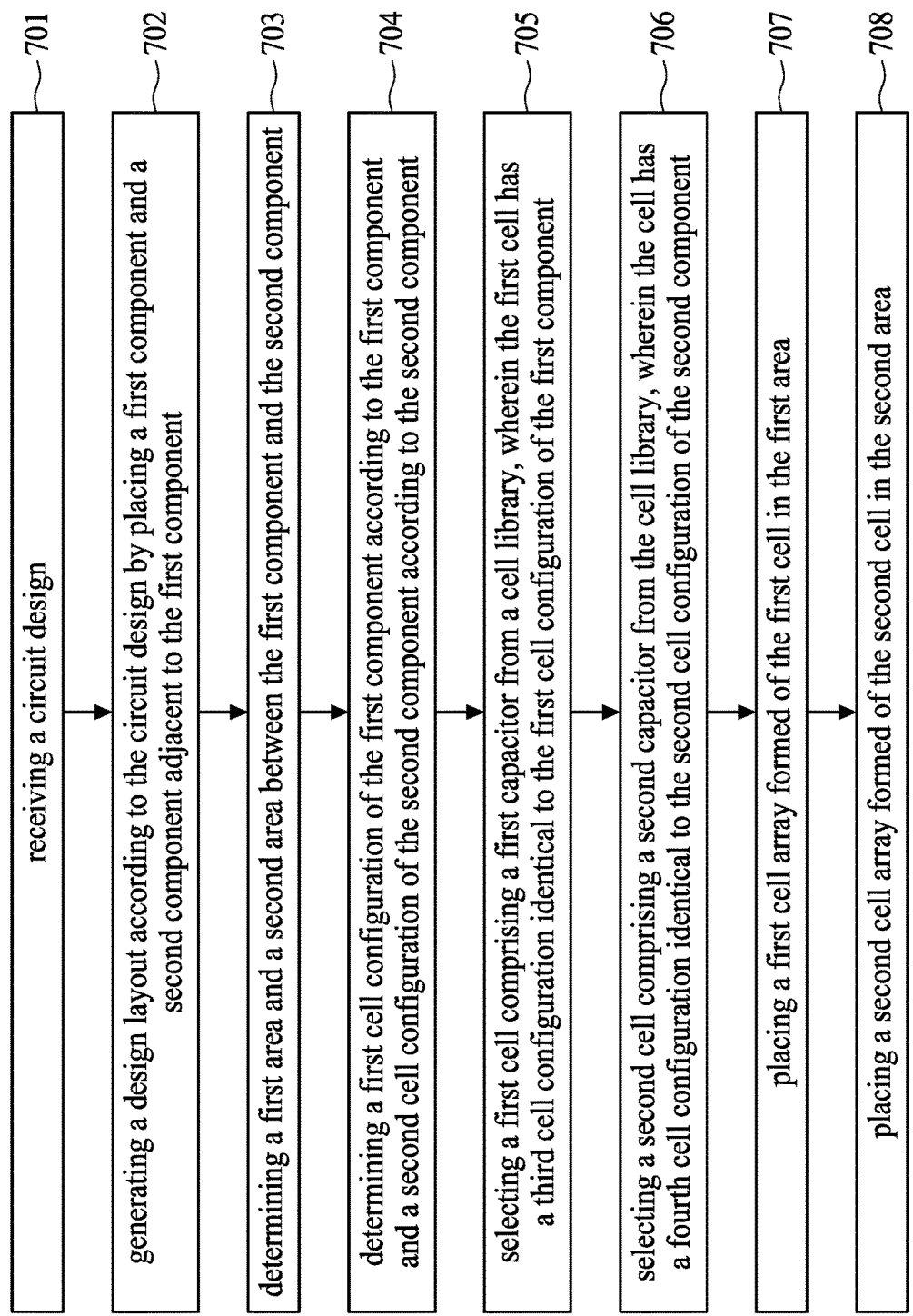
FIG. 15 is a flowchart illustrating a method, in accordance with some embodiments of the present disclosure.

FIG. 15 is a flowchart of a method 700 of a placement and routing operation, in accordance with some embodiments. Additional steps can be provided before, during, and after the steps shown in FIG. 1, and some of the steps described below can be replaced or eliminated in other embodiments of the method 700. The order of the steps may be interchangeable.

In step 701, a circuit design is received. In step 702, a design layout according to the circuit design by placing a first component and a second component adjacent to the first component is generated. In step 703, a first area and a second area between the first component and the second component is determined. In step 704, a first cell configuration of the first component according to the first component and a second cell configuration of the second component according to the second component are determined.

In step 705, a first cell comprising a first capacitor is selected from the cell library, wherein the first cell has a third cell configuration identical to the first cell configuration of the first component. In step 706, a second cell comprising a second capacitor is selected from the cell library, wherein the second cell has a fourth cell configuration identical to the second cell configuration of the second component. In step 707, a first cell array formed of the first cell in the first area is placed. In step 708, a second cell array formed of the second cell in the second area is place. At least one of the receiving, generating, determining, selecting and placing steps is performed by a processor.

Figure 16:
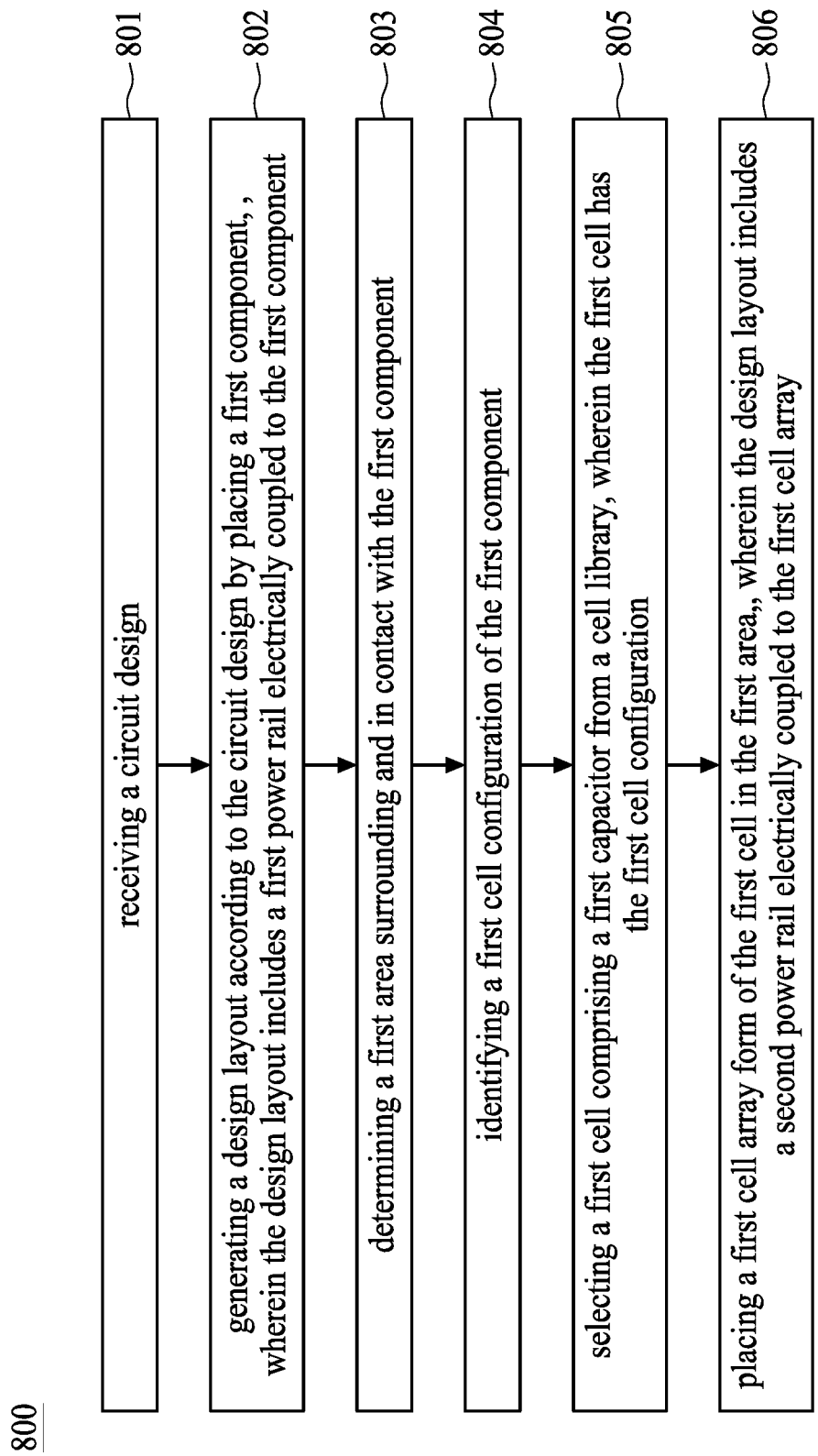
FIG. 16 is a flowchart illustrating a method, in accordance with some embodiments of the present disclosure.

FIG. 16 is a flowchart of a method 800 of a placement and routing operation, in accordance with some embodiments. Additional steps can be provided before, during, and after the steps shown in FIG. 1, and some of the steps described below can be replaced or eliminated in other embodiments of the method 800. The order of the steps may be interchangeable.

In step 801, a circuit design is received. In step 802, a design layout according to the circuit design by placing a first component is generated, wherein the design layout includes a first power rail electrically coupled to the first component. In step 803, a first area surrounding and in contact with the first component is determined. In step 804, a first cell configuration of the first component is identified. In step 805, a first cell comprising a first capacitor is selected from the cell library, wherein the first cell has the first cell configuration. In step 806, a first cell array form of a first cell in the first area is placed, wherein the design layout includes a second power rail electrically coupled to the first cell array. At least one of the receiving, generating, determining, identifying, selecting and placing steps is performed by a processor.

Figure 17:
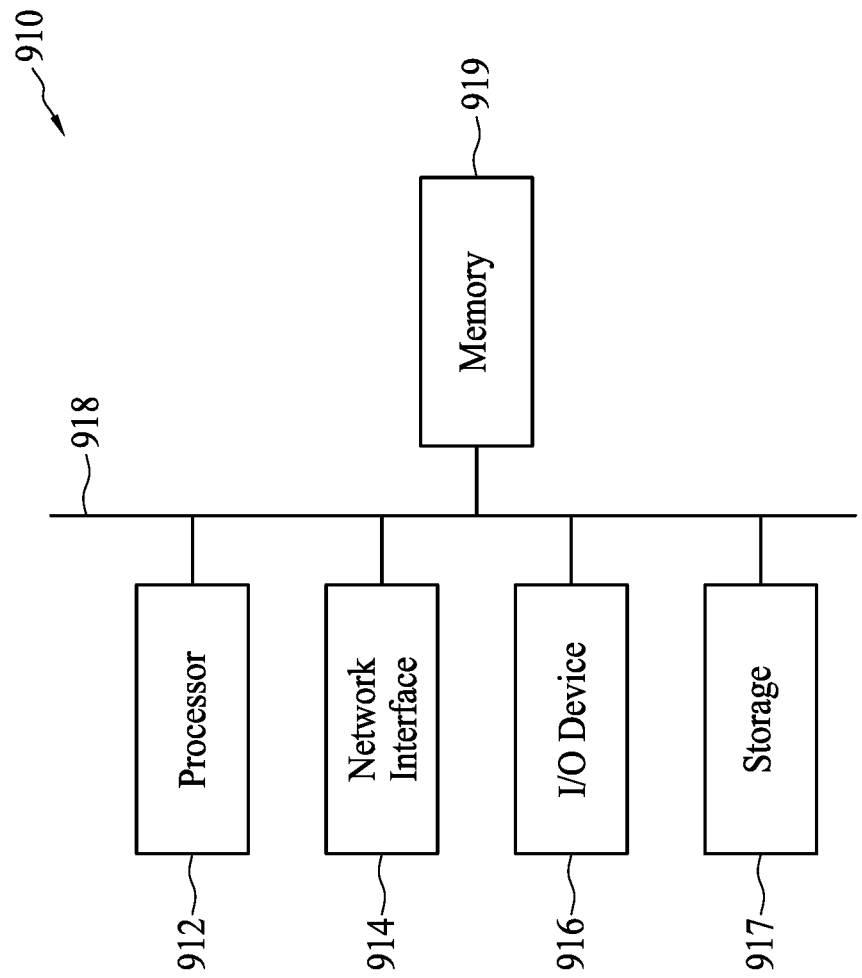
FIG. 17 is a schematic diagram of an IC manufacturing system for the design flow shown in FIG. 1, in accordance with some embodiments of the present disclosure.

FIG. 17 is a schematic diagram of a design subsystem 910 of an IC manufacturing system uses for the design flow of the generating the semiconductor integrated circuit (IC) as discussed above and shown in FIG. 1, in accordance with some embodiments. In some embodiments, the design subsystem 910 is a computer system. The design subsystem 910 includes a processor 912, a network interface 914, an input and output (I/O) device 916, a storage device 917, a memory 919, and a bus 918. The bus 918 couples the network interface 914, the I/O device 916, the storage device 917, the memory 919 and the processor 912 to each other.

The processor 912 is configured to execute program instructions that include a tool configured to generate the design layouts as described and illustrated with reference to figures of the present disclosure.

The network interface 914 is configured to access program instructions and data accessed by the program instructions stored remotely through a network (not shown).

The I/O device 916 includes an input device and an output device configured for enabling user interaction with the circuit design subsystem 910. In some embodiments, the input device includes, for example, a keyboard, a mouse, and other devices. Moreover, the output device includes, for example, a display, a printer, and other devices.

The storage device 917 is configured for storing the design layouts, program instructions and data accessed by the program instructions. In some embodiments, the storage device 917 includes a standard cell library for storing the data of the standard cells as discussed in the present disclosure. In some embodiments, the storage device 917 includes a non-transitory computer-readable storage medium, for example, a magnetic disk and an optical disk.

The memory 919 is configured to store program instructions to be executed by the processor 912 and data accessed by the program instructions. In some embodiments, the memory 919 includes any combination of a random-access memory (RAM), some other volatile storage device, a read-only memory (ROM), and some other non-volatile storage device.

In accordance with some embodiments of the disclosure, a method includes receiving a circuit design; generating a design layout according to the circuit design by placing a first component and a second component adjacent to the first component; and determining a first area and a second area between the first component and the second component. The method further includes determining a first cell configuration of the first component according to the first component and a second cell configuration of the second component according to the second component; selecting a first cell comprising a first capacitor from a cell library, wherein the first cell has a third cell configuration identical to the first cell configuration of the first component; and selecting a second cell comprising a second capacitor from the cell library, wherein the second cell has a fourth cell configuration identical to the second cell configuration of the second component. The method further includes placing a first cell array formed of the first cell in the first area; and placing a second cell array formed of the second cell in the second area. At least one of the receiving, generating, determining, selecting and placing steps is performed by a processor.

In accordance with some embodiments of the disclosure, a method includes receiving a circuit design; generating a design layout according to the circuit design by placing a first component, wherein the design layout includes a first power rail electrically coupled to the first component; and determining a first area surrounding and in contact with the first component. The method further includes identifying a first cell configuration of the first component; selecting a first cell comprising a first capacitor from a cell library, wherein the first cell has the first cell configuration; and placing a first cell array form of the first cell in the first area, wherein the design layout includes a second power rail electrically coupled to the first cell array. At least one of the receiving, generating, determining, identifying, selecting and placing steps is performed by a processor.

In accordance with some embodiments of the disclosure, a semiconductor device includes a first component comprising a plurality of first cells having a first cell configuration, and a second component comprising a plurality of second cells having a second cell configuration different from the first cell configuration. The semiconductor device further includes a zone separating the first component from the second component and filling spaces of the semiconductor device left out by the first component and the second component from a top-view perspective. The zone includes a first area adjacent to the first component, wherein the first area includes an array of a third cell having a third cell configuration identical to the first cell configuration of the first component. The zone further includes a second area adjacent to the second component, wherein the second area includes an array of a fourth cell having a fourth cell configuration identical to the second cell configuration of the second component.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method, comprising:
receiving a circuit design;
generating a design layout according to the circuit design by placing a first component and a second component adjacent to the first component;
determining a first area and a second area between the first component and the second component;
determining a first cell configuration of the first component according to the first component and a second cell configuration of the second component according to the second component;
selecting a first cell comprising a first capacitor from a cell library, wherein the first cell has a third cell configuration identical to the first cell configuration of the first component;

selecting a second cell comprising a second capacitor from the cell library, wherein the second cell has a fourth cell configuration identical to the second cell configuration of the second component;

placing a first cell array formed of the first cell in the first area; and placing a second cell array formed of the second cell in the second area, wherein at least one of the receiving, generating, determining, selecting and placing steps is performed by a processor.

2. The method according to claim 1, further comprising manufacturing a semiconductor device according to the design layout.

3. The method according to claim 2, wherein the manufacturing of the semiconductor device comprises performing a planarization operation across the first component, the second component, the first area and the second area.

4. The method according to claim 1, wherein the first area is between the first component and the second area.

5. The method according to claim 1, wherein a width, measured in a direction perpendicular to a first side of the first component, of the first area is equal to a width of the second area measured in a direction perpendicular to a second side of the second component.

6. The method according to claim 1, wherein the first area and the second area are determined such that all unused spaces of the design layout left out by the first component and the second component are allocated to the first area and the second area.

7. The method according to claim 1, wherein determining the first area comprises providing a line between a first side of the first component and a second side of the second component facing the first side, wherein the first area is defined by the line and the first component.

8. The method according to claim 7, wherein a first distance between the line and the first side is equal to a second distance between the line and the second side.

9. The method according to claim 1, further comprising:
routing a mental line above the first area or the second area to electrically couple to the first cell or the second cell.

10. The method according to claim 1, further comprising:
selecting a third cell comprising a third capacitor from the cell library, wherein the third cell has a fifth cell configuration different from the first cell configuration and the second cell configuration; and
placing a third cell array formed of the third cell in the design layout adjacent to the first component and the second component prior to the placing of the first cell array and the second cell array.

11. The method according to claim 1, further comprising electrically connecting the first component and the second components to one or more power rails, wherein the placing of the first cell array and the second cell array comprises electrically connecting the first cell array and the second cell array to the one or more power rails.

12. The method according to claim 1, wherein the first cell configuration includes at least one of a gate width, a gate density, a gate height, a fin height, a fin width, a gate pitch, a fin pitch, a power rail density, a cell length, a row height, a length of an active region and a width of the active region.

13. A method, comprising:
receiving a circuit design;
generating a design layout according to the circuit design by placing a first component, wherein the design layout includes a first power rail electrically coupled to the first component;
determining a first area surrounding and in contact with the first component;
identifying a first cell configuration of the first component;
selecting a first cell comprising a first capacitor from a cell library, wherein the first cell has the first cell configuration; and
placing a first cell array formed of the first cell in the first area,
wherein the design layout includes a second power rail electrically coupled to the first cell array,
wherein at least one of the receiving, generating, determining, identifying, selecting and placing steps is performed by a processor.

14. The method according to claim 13, further comprising:
placing a second component adjacent to the first component;
determining a second area laterally surrounding the second component; and
placing a second cell array formed of a second cell in the second area, wherein the second cell comprises a capacitor, and wherein both the second component and the second cell array have a second cell configuration.

15. The method according to claim 14, wherein the first area is in contact with the second area.

16. The method according to claim 14, wherein the second area separates the first area from the second component.

17. The method according to claim 13, further comprising performing a simulation to determine whether the first cell fulfills a specification prior to determining the first area.

18. A method, comprising:
receiving a circuit design;
generating a design layout according to the circuit design by defining a first zone and a second zone adjacent to the first zone;
placing a first component in the first zone and a second component in the second zone;
defining a third zone of the design layout adjacent to the first zone and the second zone;
placing a third component comprising a third cell in the third zone;
providing a line between the first zone and the second zone;
determining a first area and a second area between the first component and the second component;
determining a first cell configuration of the first component and a second cell configuration of the second component;
selecting a first cell comprising a first capacitor from a cell library, wherein the first cell has a third cell configuration identical to the first cell configuration of the first component;
selecting a second cell comprising a second capacitor from a cell library, wherein the second cell has a fourth cell configuration identical to the second cell configuration of the second component;
placing a first cell array formed of the first cell in the first area; and
placing a second cell array formed of the second cell in the second area.

19. The method according to claim 18, wherein defining the third zone and generating the design layout according to the circuit design are performed simultaneously.

20. The method according to claim 18, wherein the first component includes a FinFET device.

\* \* \* \* \*